(12) United States Patent
Takaki et al.

(10) Patent No.: US 8,027,514 B2
(45) Date of Patent: Sep. 27, 2011

(54) APPARATUS FOR RECOGNIZING OBJECT IN IMAGE

(75) Inventors: Masanari Takaki, Chiryu (JP); Hironobu Fujiyoshi, Kasugai (JP)

(73) Assignee: Denso Corporation, Kariya (JP)

( * ) Notice: Subject to any disclaimer, the term of this patent is extended or adjusted under 35 U.S.C. 154(b) by 842 days.

(21) Appl. No.: 12/080,936

(22) Filed: Apr. 7, 2008

(65) Prior Publication Data

US 2008/0247651 A1 Oct. 9, 2008

(30) Foreign Application Priority Data

Apr. 9, 2007 (JP) .................. 2007-102105

(51) Int. Cl.
*G06K 9/00* (2006.01)
*G06K 9/68* (2006.01)
(52) U.S. Cl. ....................... 382/103; 382/219
(58) Field of Classification Search .......... 382/100, 382/103, 130, 141, 203, 219, 236; 342/450; 348/113, 171, 196; 378/62; 340/146.3, 945; 345/418
See application file for complete search history.

(56) References Cited

U.S. PATENT DOCUMENTS

| | | | |
|---|---|---|---|
| 5,801,970 A * | 9/1998 | Rowland et al. | 703/6 |
| 6,215,914 B1 * | 4/2001 | Nakamura et al. | 382/284 |
| 6,711,293 B1 | 3/2004 | Lowe | |
| 2009/0087038 A1 * | 4/2009 | Okada et al. | 382/118 |
| 2009/0324026 A1 * | 12/2009 | Kletter | 382/124 |

FOREIGN PATENT DOCUMENTS

| | | |
|---|---|---|
| JP | 04-291472 | 10/1992 |
| JP | 2005-038121 | 2/2005 |
| JP | 2006-065399 | 3/2006 |
| JP | 2006-133979 | 5/2006 |

OTHER PUBLICATIONS

Lowe, David G., "Distinctive Image Features From Scale-Invariant Keypoints", International Journal of Computer Vision; Jan. 5, 2004; pp. 1-28.
Lowe, David G., "Object Recognition From Local Scale-Invariant Features", Proc. of the International Conference on Computer Vision, CORFU; Sep. 1999, pp. 1-8.
Notification of Reasons for Rejection in corresponding JP Application No. 2007-102105 dated May 10, 2011 with English translation thereof.
Yamaguchi, Osamu et al., "Pattern Hashing: Distributed Appearance Model Using Local Images and Invariant Indexing", Journal of Information Processing, IPSJ, Apr. 15, 2003; pp. 64-73.

* cited by examiner

*Primary Examiner* — Samir Ahmed
*Assistant Examiner* — Mehdi Rashidian
(74) *Attorney, Agent, or Firm* — Harness, Dickey & Pierce, PLC

(57) ABSTRACT

An object recognition apparatus sets each of keypoints extracted from a typical image and one of keypoints extracted from an input image, having scale invariant features similar to each other, as a typical corresponding point and an object corresponding point matching with each other, and produces a position vector directed from a typical reference point of the typical image to each typical keypoint. The apparatus determines a position of an object reference point in the input image from a position of each object corresponding point and the vector of the typical corresponding point matching with the object corresponding point. When the positions of the object reference point are concentrated, the apparatus judges that an object picture having the object corresponding points in the input image matches with the typical image, and the apparatus recognizes the picture as an object indicated by the typical image.

9 Claims, 22 Drawing Sheets

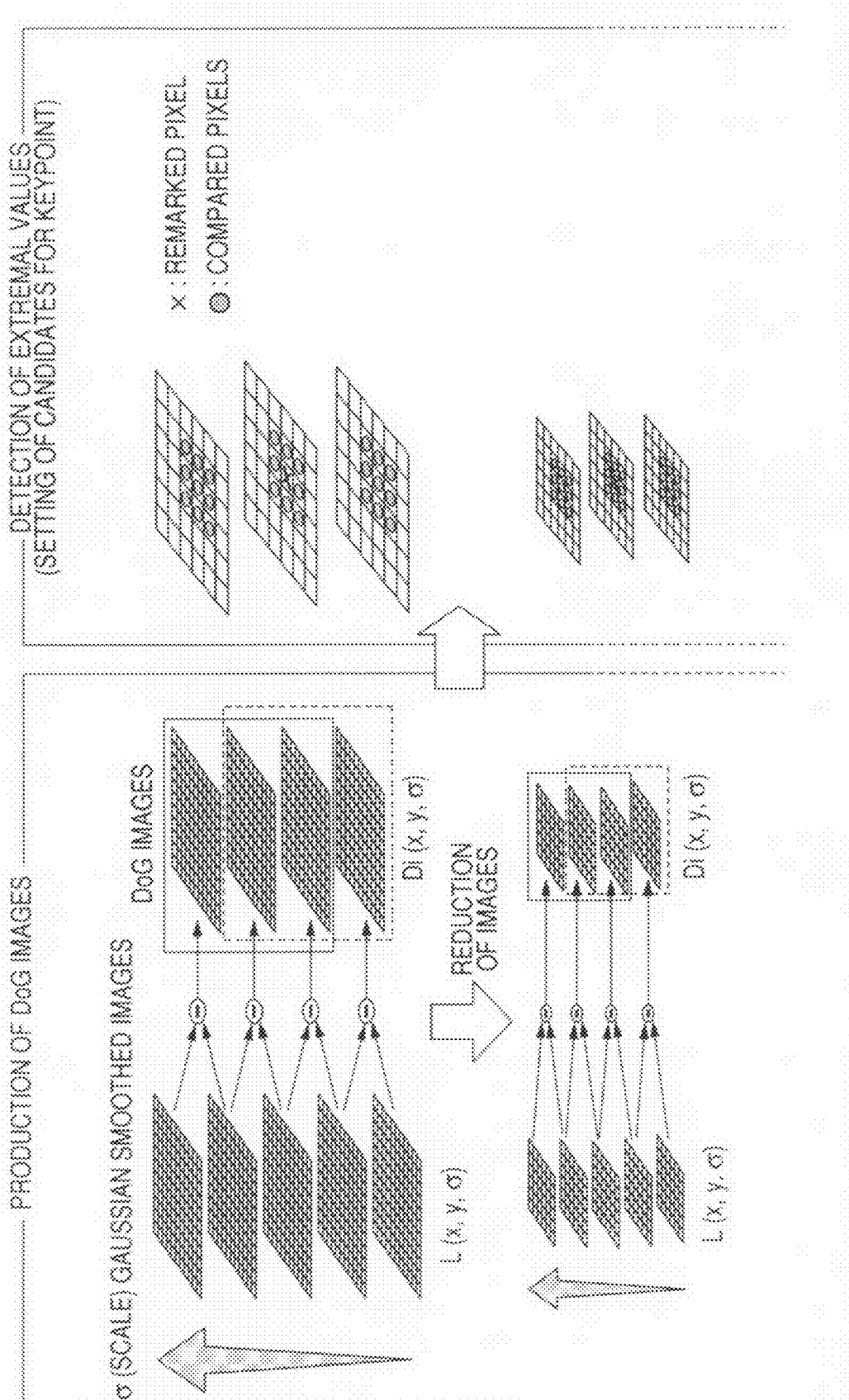

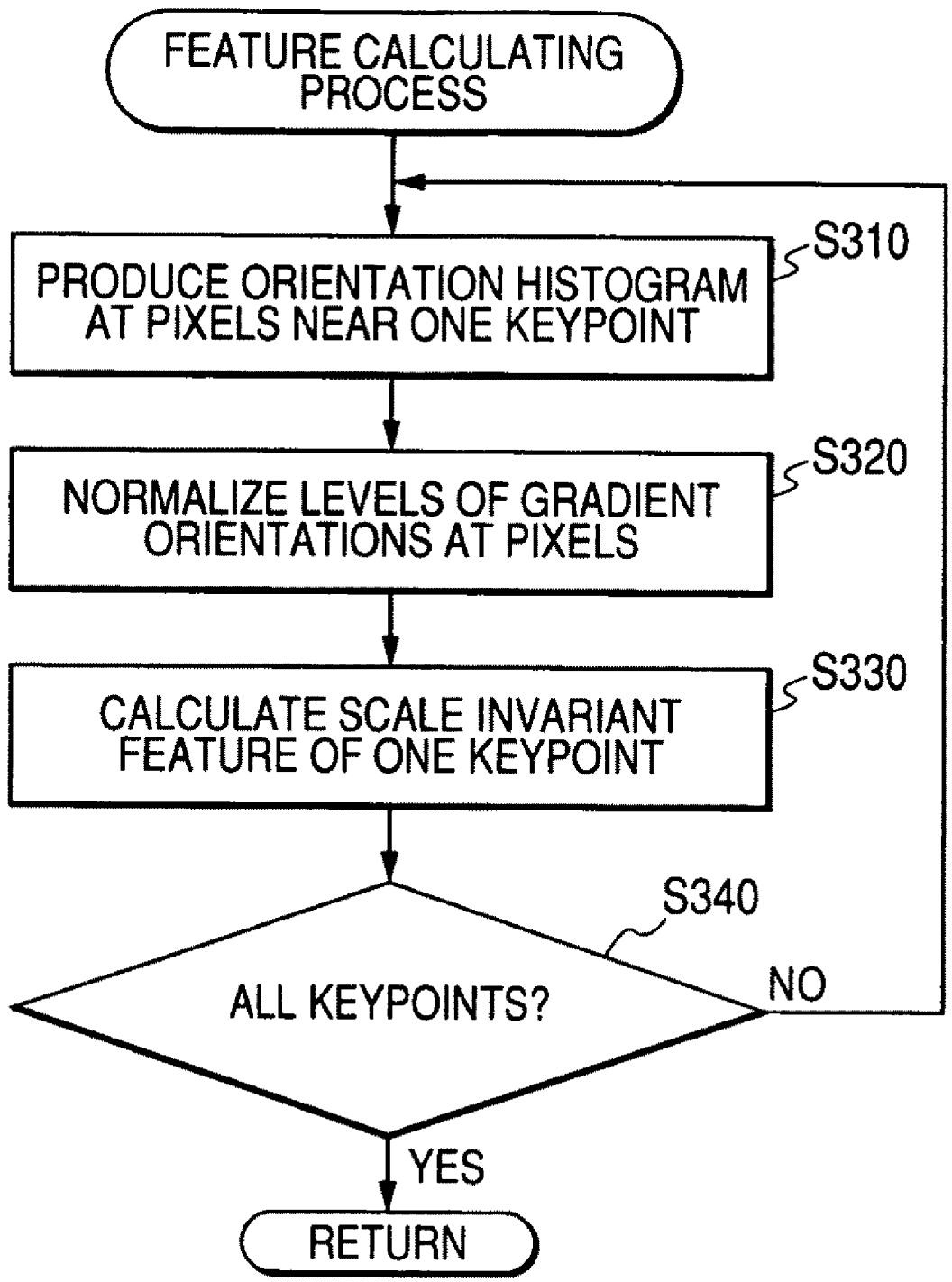

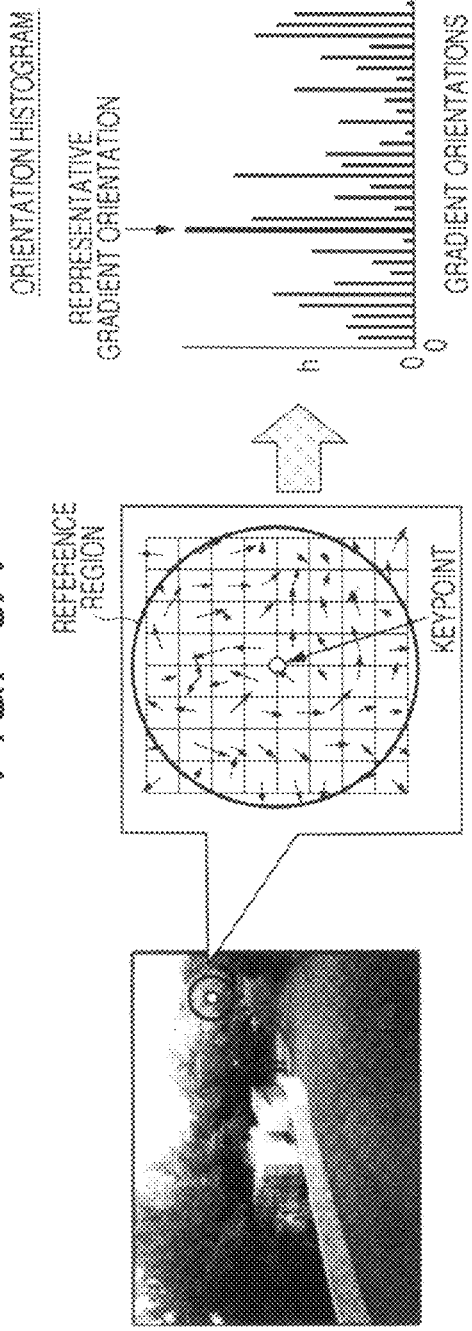
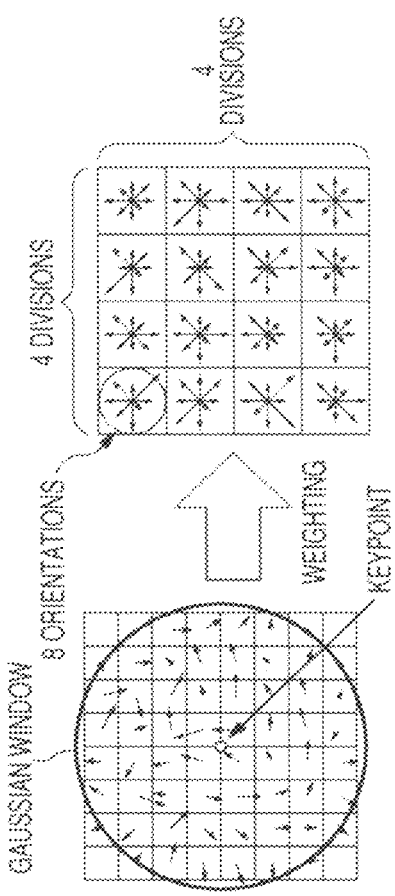
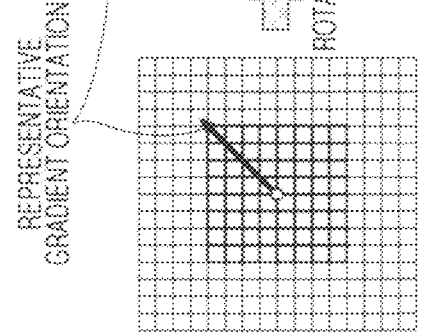
FIG. 6A
FIG. 6C
FIG. 6B

TYPICAL IMAGE

→ : GRADIENT ORIENTATION OF LUMINANCE
◌ : REFERENCE REGION
● : KEY POINT
○ : TYPICAL REFERENCE POINT
→ : POSITION VECTOR

● : CORRESPONDING POINT
○ : POSITIONS OF REFERENCE POINT
→ : GRADIENT ORIENTATION OF LUMINANCE
◌ : REFERENCE REGION

APPARATUS FOR RECOGNIZING OBJECT IN IMAGE

CROSS-REFERENCE TO RELATED APPLICATION

This application is based upon and claims the benefit of priority of the prior Japanese Patent Application 2007-102105 filed on Apr. 9, 2007 so that the contents of which are incorporated herein by reference.

BACKGROUND OF THE INVENTION

1. Field of the Invention

The present invention relates to an object recognition apparatus which recognizes an object picture existing in an input image as an object indicated by a typical image when the object picture matches with the typical image.

2. Description of Related Art

Various techniques for recognizing a picture of an input image matching with a registered typical image have been proposed. For example, keypoints are extracted from an input image, an image feature at each keypoint is calculated, and each calculated feature is compared with image features at keypoints extracted from a typical image. In response to this comparison, it is judged whether an object matching with the typical image exists in the input image.

This method of comparing features of keypoints in an input image with features of keypoints in a typical image has been disclosed in both a patent document (Published Japanese Patent First Publication No. 2006-65399) and a non-patent document ("Distinctive Image Features from Scale-Invariant Keypoints" written by David G. Lowe, International Journal of Computer Vision, 2004). More specifically, features are set to be invariant to image scaling (i.e., image enlargement and reduction) and rotation. Therefore, even when a size or position in rotation of an object picture existing in an input image differs from a typical image of an object, the object picture can be recognized as the object.

In this comparing method, image smoothing using the Gaussian function is performed for an input image. More specifically, a plurality of smoothed images corresponding to respective scales of the Gaussian function are calculated from an input image. A DoG (difference-of-Gaussian) filter is applied to the smoothed images corresponding to the different scales to obtain a plurality of DoG images, and extremal values are detected from the DoG images. A point (i.e., pixel) of each extremal value is set as a candidate for a keypoint (herein after, called keypoint candidate). The scale of each DoG image having at least one extremal value is used later to calculate a feature at the point of the extremal value. In the same manner, the input image is reduced or minified at each of the reduction ratios to obtain reduced images, other DoG images are calculated from each of the reduced images, and other keypoint candidates of the input image are detected from the other DoG images.

In this detection of the keypoint candidates, there is a probability that some of the keypoint candidates cause an opening problem. To solve this problem, keypoints having lower contrasts and keypoints located on edges are removed from the keypoint candidates to extract stable keypoints from the input image.

Thereafter, an image feature is calculated for each extracted keypoint. The image feature of each keypoint contains a feature element invariant to image scaling, scale information required for the calculation of the scale invariant feature, and information (i.e., rotation information) indicating a rotation of an image within a predetermined area around the keypoint. The predetermined area is determined according to the scale information. As described in detail in the documents, the scale invariant feature is invariant to image scaling (i.e., image enlargement and reduction) and rotation. Therefore, even when an object picture matching with a typical image exists in an input image at any size or rotational position, the object picture can be recognized as the object.

In the matching operation, a scale invariant feature at each keypoint of the typical image is compared with scale invariant features of all keypoints in the input image. When features of some keypoints in the input image are the same as or similar to respective features of keypoints in the typical image, it can be judged that an object picture matching with the typical image exists in the input image.

For example, the number of keypoints existing in a typical image is equal to 100, and keypoints having the same or similar features as or to respective features of the keypoints of the typical image are extracted from an input image. When the number of keypoints extracted from the input image is equal to 90 or more, a picture of an object matching with the typical image exists in the input image at a high probability. Therefore, the object picture can be recognized as the object. In contrast, when the number of keypoints extracted from the input image is equal to 10 or less, a picture of an object matching with the typical image exists in the input image at a low probability. Therefore, no object indicated by the typical image is recognized.

However, even when a picture of an object matching with a typical image actually exists in an input image, it is sometimes difficult to sufficiently extract keypoints of the object from the input image. In this case, because the number of keypoints of the object extracted from the input image becomes small, it is sometimes misjudged that no object matching with the typical image exists in the input image.

For example, in case of the occurrence of occlusion, picture of a remarked object matching with a typical image is hidden behind a picture of another object in an inputted image, so that the remarked object is partially shown in the input image. In this case, although the object picture matching with the typical image exists in the input image, keypoints of the remarked object cannot sufficiently be extracted from the input image. As a result, the number of keypoints of the remarked object extracted from the input image becomes small.

Further, when an object picture is shown at an extremely small size in an input image, keypoints of an object cannot be sufficiently extracted from the input image. That is, when the object picture shown in an input image has almost the same size as that of a typical image of the object, the number of keypoints of the object extracted from the input image becomes almost equal to the number of keypoints of the typical image. In contrast, when the object picture is extremely small in size in comparison with the typical image, resolution in the object picture is very low. Therefore, the number of keypoints of the object extracted from the input image becomes very small.

As described above, in the object recognition, using the scale invariant features of the keypoints, an object picture matching with a typical image in an input image is preferably recognized as an object having the typical image, regardless of image scaling (i.e., image enlargement and reduction) or rotation. However, when an object picture matching with a typical image is set in a specific condition (occlusion, extremely small size or the like) in an input image, a small number of keypoints having the same or similar features as or to respective features of keypoints of the typical image are extracted from the input image. Therefore, it is sometimes misjudged that no object picture matching with the typical image exists in the input image.

SUMMARY OF THE INVENTION

An object of the present invention is to provide, with due consideration to the drawbacks of the conventional object recognition apparatus, an object recognition apparatus which reliably recognizes a picture of an object matching with a typical image in an input image as the object even when keypoints of the object are insufficiently extracted from the input image.

According to a first aspect of this invention, the object is achieved by the provision of an object recognition apparatus comprising a unit extracting a plurality of typical feature points from a typical image, a unit calculating a feature of each typical feature point from image data of the typical image, a unit extracting a plurality of object feature points from an input image, a unit calculating a feature of each object feature point from image data of the input image, a corresponding point setting unit, an information producing unit, a judging unit, and a recognizing unit. The setting unit calculates similarities between the feature of one typical feature point and the features of the object feature points for each typical feature point, judges based on the similarities whether or not the features of both one typical feature point and one object feature point in each pair are similar to each other, and sets one typical feature point and one object feature point in each pair, having the features similar to each other, as a typical corresponding point and an object corresponding point matching with each other. The producing unit produces position information indicating positions of the typical feature points in the typical image. The judging unit judges based on the position information of the typical corresponding points whether or not a positional relationship between or among the object corresponding points is substantially similar to a positional relationship between or among the typical corresponding points. The recognizing unit recognizes an object picture having the object corresponding points in the input image as an object indicated by the typical image when the judging unit judges that the positional relationships are substantially the same as each other.

With this configuration of the apparatus, if an object picture matching with the typical image exists in the input image, the relationships become similar to each other even when a scale difference or a rotation difference exists between the images. In the present invention, when the judging unit judges based on the position information of the typical corresponding points that the positional relationships are similar to each other, the recognizing unit recognizes an object picture having the object corresponding points in the input image as an object indicated by the typical image.

In the prior art, when the number of keypoints (i.e., feature points) of an input image matching with keypoints of a typical image is large, it is judged that an object picture matching with a typical image exists in the input image. Therefore, to reliably recognize an object picture matching with a typical image, many keypoints of the input image matching with keypoints of the typical image are necessary. In contrast, in the present invention, a similarity between the positional relationships is judged. Accordingly, even when object corresponding points are insufficiently extracted from the input image, the apparatus can reliably recognize an object picture having the object corresponding points in the input image as an object indicated by the typical image.

According to a second aspect of this invention, the judging unit judges whether or not a ratio of the number of object corresponding points to the number of typical feature points is higher than a predetermined value, and the recognizing unit recognizes an object picture having the object corresponding points in the input image as an object indicated by the typical image when the judging unit judges that the ratio is higher than the predetermined value.

With this configuration of the apparatus, in the same manner as in the first aspect of this invention, the apparatus can reliably recognize an object picture having the object corresponding points in the input image as an object indicated by the typical image.

BRIEF DESCRIPTION OF THE DRAWINGS

FIG. 4 is an explanatory view showing the production of DoG images and the detection of keypoint candidates from the DoG images-in the process shown in FIG. 3;

FIG. 5 is a flow chart showing a process for calculating features at respective object keypoints;

FIG. 6A is an explanatory view showing the determination of a representative gradient orientation of one keypoint in the process shown in FIG. 5;

FIG. 6B is an explanatory view showing a rotation of a region around one keypoint by the representative gradient orientation in the process shown in FIG. 5;

FIG. 6C is an explanatory view showing the calculation of a scale invariant feature at one keypoint in the process shown in FIG. 5;

DETAILED DESCRIPTION OF THE PREFERRED EMBODIMENTS

Figure 1:
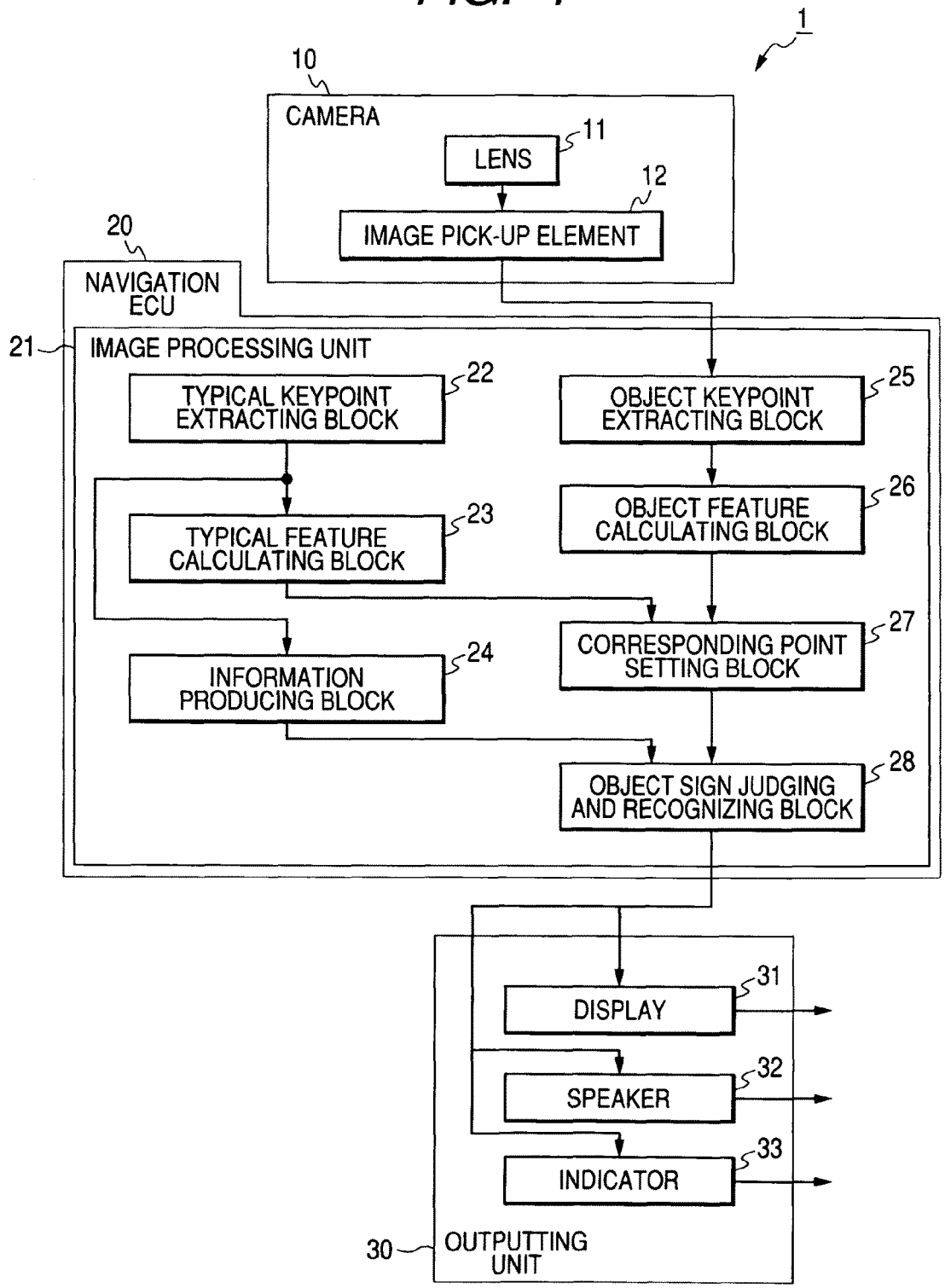
FIG. 1 is a block diagram of a sign recognition apparatus representing an object recognition apparatus according to the first embodiment of the present invention.

Embodiments of the present invention will now be described with reference to the accompanying drawings, in which like reference numerals indicate like parts, members or elements throughout the specification unless otherwise indicated.

Embodiment 1

FIG. 1 is a block diagram of a sign recognition apparatus representing an object recognition apparatus according to the first embodiment. A sign recognition apparatus 1 shown in FIG. 1 is mounted in a motor vehicle. The apparatus 1 photographs a view from a front window of the vehicle to obtain an input image of a predetermined area placed in a forward direction of the vehicle and judges whether or not a picture of an object matching with a typical image such as a road sign or the like is shown or exists in the input image. When the apparatus 1 recognizes the object picture matching with the typical image, the apparatus 1 informs a driver that the object exists in a forward direction of the vehicle.

As shown in FIG. 1, the apparatus 1 comprises a color-picture camera 10, a navigation ECU (electronic control unit) 20, and an outputting unit 30. The camera 10 is disposed near an inside rear-view mirror to produce an image of an area seen in a forward direction of the vehicle. The camera 10 has a lens 11 and an image pick-up element 12. The element 12 receives image information through the lens 11 and outputs an image signal (e.g., pixel signals for pixels, and each pixel signal indicates a red, green or blue signal) indicating the image information to the ECU 20. The apparatus 1 may have a camera producing a monochrome image in place of the camera 10.

The ECU 20 has a control mechanism to control a navigation system (not shown). Further, the ECU 20 has an image processing unit 21 for recognizing objects such as road signs and the like on the basis of image data of an image signal. The ECU 20 receives the image signal indicating an input image. A typical image of each road sign is registered in advance in the unit 21. The unit 21 judges based on the typical images whether or not an object picture matching with at least one of the typical images exists in the input image. The unit 21 outputs a judgment result to the outputting unit 30.

The unit 21 comprises a typical keypoint extracting block 22, a typical feature calculating block 23, an information producing block 24, an object keypoint extracting block 25, an object feature calculating block 26, a corresponding point setting block 27, and an object sign judging and recognizing block 28.

The extracting block 22 extracts a plurality of typical keypoints (i.e., typical feature points) from each of a plurality of typical images. The calculating block 23 calculates a scale invariant feature at each typical keypoint from image data of the corresponding typical image. The producing block 24 produces position information indicating a position of one typical keypoint in the corresponding typical image for each typical keypoint.

The extracting block 25 extracts a plurality of object keypoints (i.e., object feature points) from the input image. The calculating block 26 calculates a scale invariant feature at each object keypoint from image data of the input image.

The setting block 27 calculates similarities between the feature of one typical keypoint and the features of the object keypoints for each typical keypoint, judges based on the similarities whether or not the features of one typical keypoint and one object keypoint in each pair are similar to each other, and sets one typical keypoint and one object keypoint in each pair, having the features similar to each other, as a typical corresponding point and an object corresponding point matching with each other.

The judging and recognizing block 28 judges based on the position information of the typical corresponding points whether or not a positional relationship between or among the object corresponding points is substantially similar to a positional relationship between or among the typical corresponding points. When the positional relationships are substantially similar to each other, the block 28 recognizes an object picture having the object corresponding points as an object indicated by the corresponding typical image. A recognition result of the block 28 is outputted to the outputting unit 30.

The block 22 may extract the typical keypoints from the typical images each time the block 22 extracts the object keypoints from the input image. In this embodiment, when each typical image is registered in advance in the unit 21, the typical keypoints of the typical image are extracted and stored in a typical keypoint database (not shown). The block 23 may calculate the features of the typical keypoints each time the block 26 calculates the features of the object keypoints. In this embodiment, when each typical keypoint is extracted, the feature of the typical keypoint is calculated and stored in a typical feature database (not shown). That is, when each typical image is registered in the unit 21, the typical keypoints of the typical image are extracted and stored, and the features of the typical keypoints are calculated and stored. Therefore, each time the unit 21 receives one input image to make a judgment on the existence of one object in the input image, the unit 21 extracts only the object keypoints of the input image and calculates only the features of the object keypoints.

The blocks 22 to 28 of the unit 21 may be made of respective hardware members different from one another, or may be embodied by a central processing unit which executes a software program to perform the functions of the blocks 22 to 28.

The unit 30 has a display 31, a speaker 32 and an indicator 33. The display 31 displays a result of the image recognition performed in the unit 21, in addition to a map image and information produced in the navigation system. For example, when the unit 21 recognizes a road sign existing in the input image, an image of the road sign is displayed in the display 31. The speaker 32 outputs an audio guide indicating a result of the image recognition in the processing unit 21, as well as an audio guide produced in the navigation system. For example, when the unit 21 recognizes a sign of a pedestrian crossing existing in the input image, the speaker 32 outputs a synthesized voice of "a pedestrian crossing exists in the forward direction". The indicator 33 visually informs a driver of the existence of a recognized road sign. For example, when the unit 21 recognizes at least one registered road sign, the indicator 33 lights a specific LED (light emission diode) corresponding to each recognized road sign.

Figure 2:
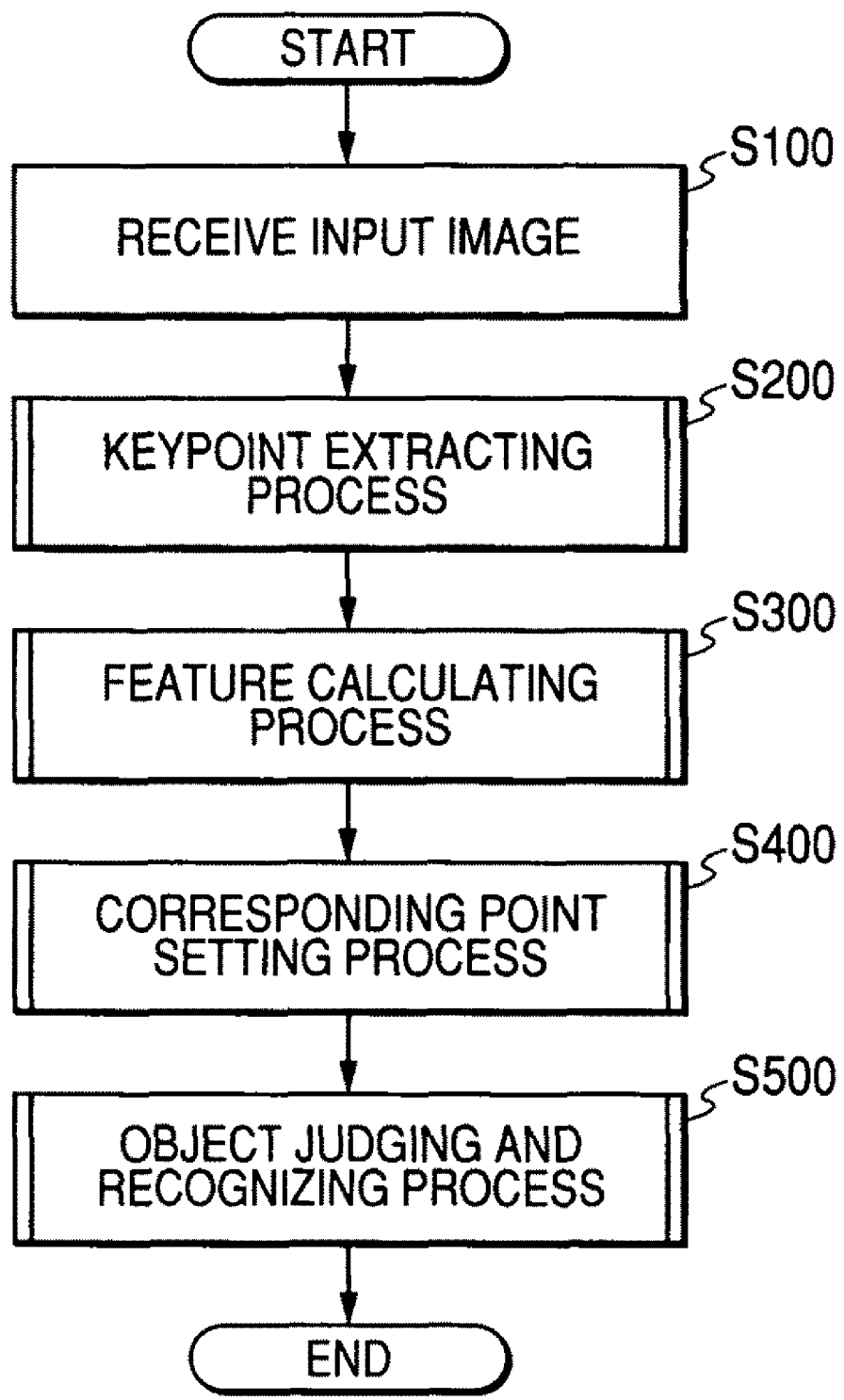
FIG. 2 is a flow chart showing an image recognition process performed in the apparatus shown in FIG. 1.

Next, an image recognition process performed in the unit 21 of the ECU 20 is now described below with reference to FIG. 2. FIG. 2 is a flow chart showing an image recognition process performed in the processing unit 21.

As shown in FIG. 2, at step S100, the unit 21 receives an input image from the camera 10. More specifically, the unit 21 receives a dynamic image from the camera 10. The dynamic image has several tens of static images per second. The unit 21 receives each static image as an input image. Therefore, the unit 21 performs an image recognition process shown in FIG. 2 for each static image. The unit 21 may perform the process every predetermined period of time.

Figure 3:
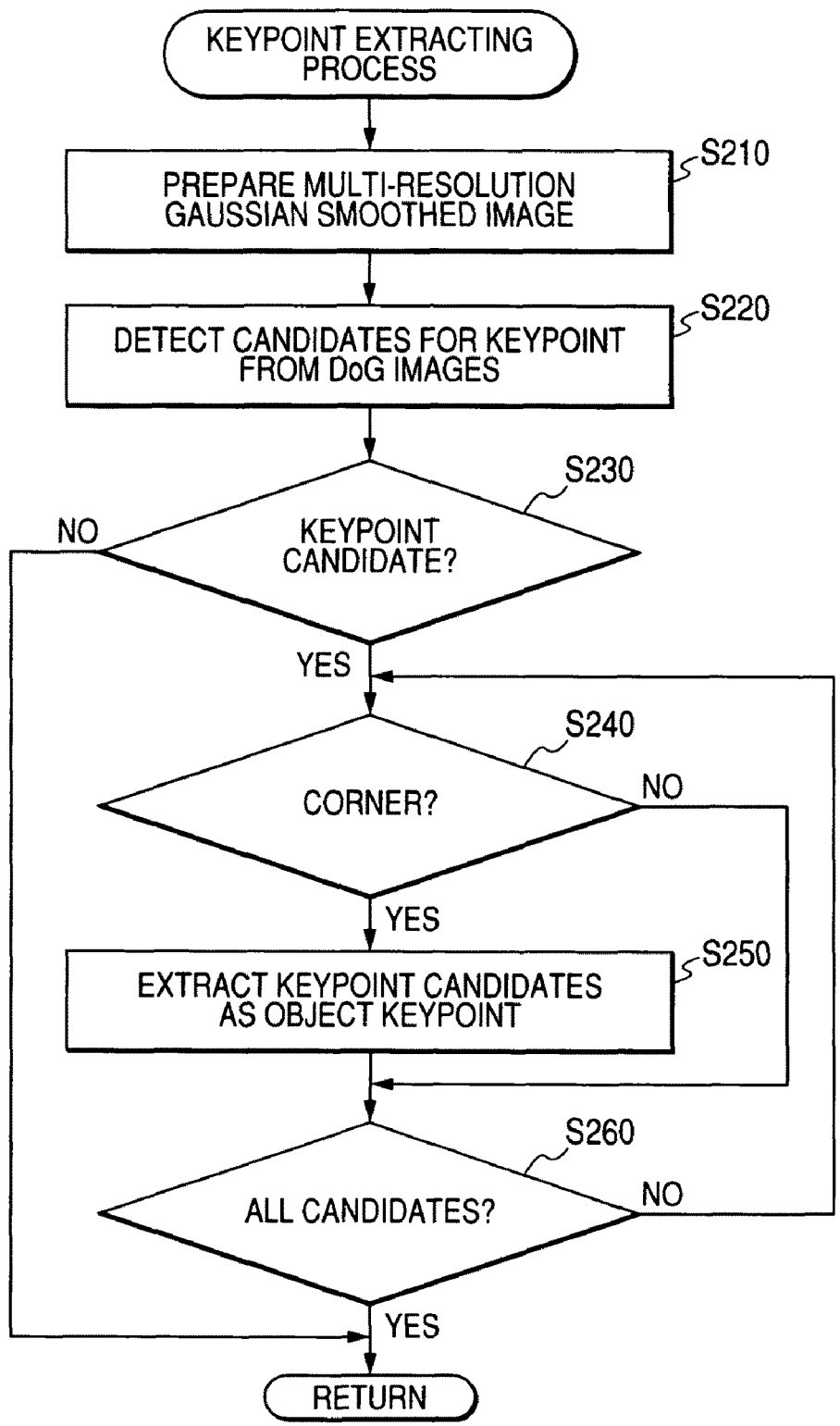
FIG. 3 is a flow chart showing a process for extracting keypoints from each of images.

At step S200, the block 25 performs a keypoint extracting process. This process is described in detail in the non-patent document, so that the process is briefly described. In the keypoint extracting process, object keypoints are extracted from an input image having pixel data for each of pixels. FIG. 3 is a flow chart showing the keypoint extracting process, and FIG. 4 is an explanatory view showing the production of DoG images and the detection of keypoint candidates from the DoG images in the keypoint extracting process.

As shown in FIG. 3, when the keypoint extracting process is initiated, at step S210, the block 25 prepares a multi-resolution Gaussian smoothed image from image data of an input image. More specifically, an input image I(x,y) is reduced in size at a reduction ratio or at each of reduction ratios to obtain a plurality of reduced input images having resolutions different from the resolution of the input image. Then, a Gaussian smoothed image L(x,y,σ) is produced according to formulas (1) and (2) from the convolution of the Gaussian function G(x,y,σ) set at a variable smoothing scale σ with each of the input images I(x,y).

$$L(x, y, \sigma) = G(x, y, \sigma) * I(x, y) \quad (1)$$

$$G(x, y, \sigma) = \frac{1}{2\pi\sigma^2} \exp\left\{\frac{-(x^2 + y^2)}{2\sigma^2}\right\} \quad (2)$$

The scale σ is set at each of a plurality of values σ i (i=1, 2, - - - ), and the image L(x,y,σ) is obtained for each value of the scale σ. Here, (x,y) denotes coordinates of each pixel of an image in a two-dimensional coordinates system.

Then, at step S220, as shown on the left side in FIG. 4, a difference between the smoothed images L(x,y, σ i+1) and L(x,y,σ i) corresponding to two nearby scales is calculated according to a formula (3) to produce a DoG (Difference of Gaussian) image Di(x,y,σ).

$$D_i(x,y,\sigma) = L(x,y,\sigma_{i+1}) - L(x,y,\sigma_i) \quad (3)$$

The DoG image is obtained for each pair of images L(x,y, σ i+1) and L(x,y,σ i). A plurality of candidates for keypoint are detected from the DoG images corresponding to different scales for each of the input images.

More specifically, a DoG filtering process (i.e., differential process) is applied for the smoothed images corresponding to the different scales to obtain a set of DoG images for each input image. For example, the production of a set of four DoG images from five smoothed images corresponding to respective scales for each input image is shown in FIG. 4. As shown on the right side in FIG. 4, each pixel in the DoG image Di(x,y,σ) is set as a remarked pixel (marked with ×) adjacent to twenty-six compared pixels (marked with ●). The compared pixels are formed of nine pixels in 3×3 pixel region of the DoG image Di−1(x,y,σ), eight pixels in 3×3 pixel region of the DoG image Di(x,y,σ) and nine pixels in 3×3 pixel region of the DoG image Di+1(x,y,σ). The block 25 judges whether or not data of the remarked pixel is an extremal value (i.e., maximal or minimal) among data of the remarked and compared pixels. In case of the affirmative judgment, the block 25 sets the remarked pixel as a candidate for an object keypoint. When the keypoint candidate is formally set as an object keypoint, the scale value σ i of the DoG image Di having the object keypoint is used to calculate an image feature of the object keypoint.

At step S230, the block 25 judges whether or not at least one keypoint candidate is set in the DoG images produced from the input images. When no keypoint candidate is set at step S220, the keypoint extracting process at step S200 is finished. In contrast, when the DoG images have at least one keypoint candidate, the procedure proceeds to step S240.

At step S240, the block 25 judges whether or not each of the keypoint candidates is placed at a corner in the corresponding DoG image. A keypoint candidate placed at a corner means that the keypoint candidate is not located on an edge. In contrast, a keypoint candidate not placed at a corner is located on an edge at a high probability. Some of the keypoint candidates set at step S220 cause an opening problem at a high probability. In this embodiment, a keypoint candidate located on an edge at a high probability is not adopted as an object keypoint, so that only a keypoint candidate having a stable feature is adopted as a true object keypoint.

More specifically, at step S240, the narrow-down of the keypoint candidates to object keypoints is performed by means of a technique similar to Harris corner detecting method. That is, a two-dimensional Hessian matrix H expressed by a formula (4) is obtained.

$$H = \begin{bmatrix} D_{xx} & D_{xy} \\ D_{xy} & D_{yy} \end{bmatrix} \quad (4)$$

where $Dxx=d[i-1][j]-2\times d[i][j]+d[i+1][j]$, $Dyy=d[i][j-1]-2\times d[i][j]+d[i][j+1]$, and $Dxy=\{(d[i+1][j+1]-d[i+1][j-1])-(d[i-1][j+1]-d[i-1][j-1])\}/4$ are satisfied. Each entry d[i][j] denotes pixel data of one pixel placed at coordinates (i,j).

Then, a keypoint candidate satisfying a formula (5) is adopted as an official object keypoint.

$$\frac{Tr(H) \times Tr(H)}{\text{Det}(H)} < Th \quad (5)$$

where $$Tr(H)=Dxx+Dyy, \text{ and}$$

$$Det(H)=Dxx \times Dyy - Dxy \times Dxy$$

are satisfied. That is, a sum Tr(H) of diagonal entries Dxx and Dyy of the Hessian matrix is calculated, and a determinant Det (H) of the Hessian matrix is calculated. When a ratio of Tr(H)×Tr(H) to Det(H) in a keypoint candidate is smaller than a predetermined threshold value Th, the block 25 judges that the keypoint candidate is placed at a corner in the corresponding DoG image. Therefore, at step S250, the keypoint candidate is officially extracted as an object keypoint, and the procedure proceeds to step S260. In contrast, in case of the negative judgment at step S240, the procedure jumps to step S260.

At step S260, the block 25 judges whether or not all the keypoint candidates set at step S220 have been processed at steps S240 and S250 or at step S240. In case of the negative judgment, steps S240 to S260 are again performed. That is, until the narrow-down of all keypoint candidates to object keypoints is finished, steps S240 to S260 are repeatedly performed. Therefore, in the feature extracting process, object keypoints are selected from all keypoint candidates set in the DoG images Di. That is, all object keypoints are substantially extracted from the input image not reduced.

In the same manner as the keypoint extracting process shown in FIG. 3 and FIG. 4, typical keypoints are extracted from each typical image and are stored in the typical keypoint database.

Returning to FIG. 2, after the keypoint extracting process, the block 26 performs a feature calculating process at step S300. That is, a feature at each object keypoint is calculated. This process is described in detail in the non-patent document, so that the process is briefly described.

FIG. 5 is a flow chart showing the feature calculating process for the object keypoints. FIG. 6A shows the determination of a representative gradient orientation of one keypoint, FIG. 6B shows a rotation of a region around the keypoint by the representative gradient orientation, and FIG. 6C shows the calculation of a scale invariant feature characterizing the keypoint.

As shown in FIG. 5, when the feature calculating process is initiated, at step S310, the block 26 calculates a gradient magnitude of luminance and a gradient orientation of luminance at each of the pixels placed near one keypoint to produce an orientation histogram indicating the gradient magnitudes of luminance and the gradient orientations of luminance at the pixels. More specifically, as shown in FIG. 6A, a gradient magnitude m(x,y) of luminance and a gradient orientation θ (x,y) of luminance in one pixel are calculated from image data of the smoothed images L according to formulas (6), (7) and (8) for each of nearby pixels (i.e., sample points) within a reference region (indicated by a circle in FIG. 6A) around one keypoint.

$$m(x, y)\sqrt{f_x(x, y)^2 + f_y(x, y)^2} \quad (6)$$

$$\theta(x, y) = \tan^{-1}\frac{f_y(x, y)}{f_x(x, y)} \quad (7)$$

$$\left.\begin{array}{l}f_x(x, y) = L(x+1, y) - L(x-1, y)\\f_y(x, y) = L(x, y+1) - L(x, y-1)\end{array}\right\} \quad (8)$$

The size of the reference region is determined based on the scale σ i of the DoG image Di having the keypoint, and the smoothed images L in the formula (8) are set at the scale σ i.

Then, an orientation histogram is formed from the gradient magnitudes m(x,y) and the gradient orientations θ (x,y) of the nearby pixels. The orientation histogram has 36 bins covering the 360 degrees range of orientations. To produce this histogram, nearby pixels having the same gradient orientation are added to the corresponding bin while being weighted by the gradient magnitudes of the respective pixels. That is, the length of each bin is set at a sum of gradient magnitudes having a gradient orientation corresponding to the bin. A gradient orientation of a specific bin having a highest peak (or maximum length) among those of the bins is set as a representative gradient orientation of the keypoint. In this embodiment, only one gradient orientation corresponding to the bin having the highest peak is assigned to each keypoint as a representative gradient orientation. However, a plurality of gradient orientations corresponding to bins, having respective peaks being within 80% of the highest peak, may be set as a group of representative gradient orientations for each keypoint.

At step S320, levels of the gradient orientations at the nearby pixels are normalized. More specifically, as shown in FIG. 6B, the reference region around the keypoint is rotated by the representative gradient orientation of the keypoint. In other words, the representative gradient orientation is subtracted from the gradient orientation of each nearby pixel within the reference region. With this normalization of the gradient orientations of the nearby pixels, an image feature of the keypoint invariant to image rotation of an object (e.g., road sign) existing in the input image can be obtained.

At step S330, a scale invariant feature of the keypoint invariant to image scaling is calculated. More specifically, as shown in FIG. 6C, a Gaussian circular window is used to assign a weight to the magnitude of each nearby pixel such that a weighting factor for one pixel is increased as a distance between the pixel and the center of the Gaussian window is shortened. The size of the Gaussian window is determined based on the scale σ i of the DoG image Di having the keypoint. In this case, for example, when the size of a first image is twice as large as that of a second image, the size of the window for the first image is twice as large as the size of the window for the second image. Therefore, the same pixels are placed within the window regardless of the scale σ, so that a feature invariant to image scaling can be obtained. Then, the reference region is divided into 16 (4×4) pixel subregions, and an orientation histogram is formed from luminance gradient magnitudes and luminance gradient orientations of nearby pixels for each subregion. Each orientation histogram has 8 bins covering the 360 degrees range of orientations. The 16 histograms are set as a scale invariant feature of the keypoint. This scale invariant feature is a 128 (8 bins×16 histograms) dimensional vector.

At step S340, the block 26 judges whether or not scale invariant features of all keypoints extracted by the block 25 at step S200 are calculated. Until the calculation of scale invariant features of all keypoints is completed, a scale invariant feature is calculated at steps S310 to S330 for each keypoint. Therefore, scale invariant features of all object keypoints are calculated in the feature extracting process.

Image features of respective typical keypoints are calculated in advance for each typical image and are stored in a database. The feature of each typical keypoint has a 128 dimensional vector of orientation histograms derived from the corresponding typical image, in the same manner as the scale invariant feature of one object keypoint. Further, the feature of each typical keypoint has position information indicating a position of the keypoint in the typical image. The calculation of features of the typical keypoints is described with reference to FIG. 7.

Figure 7:
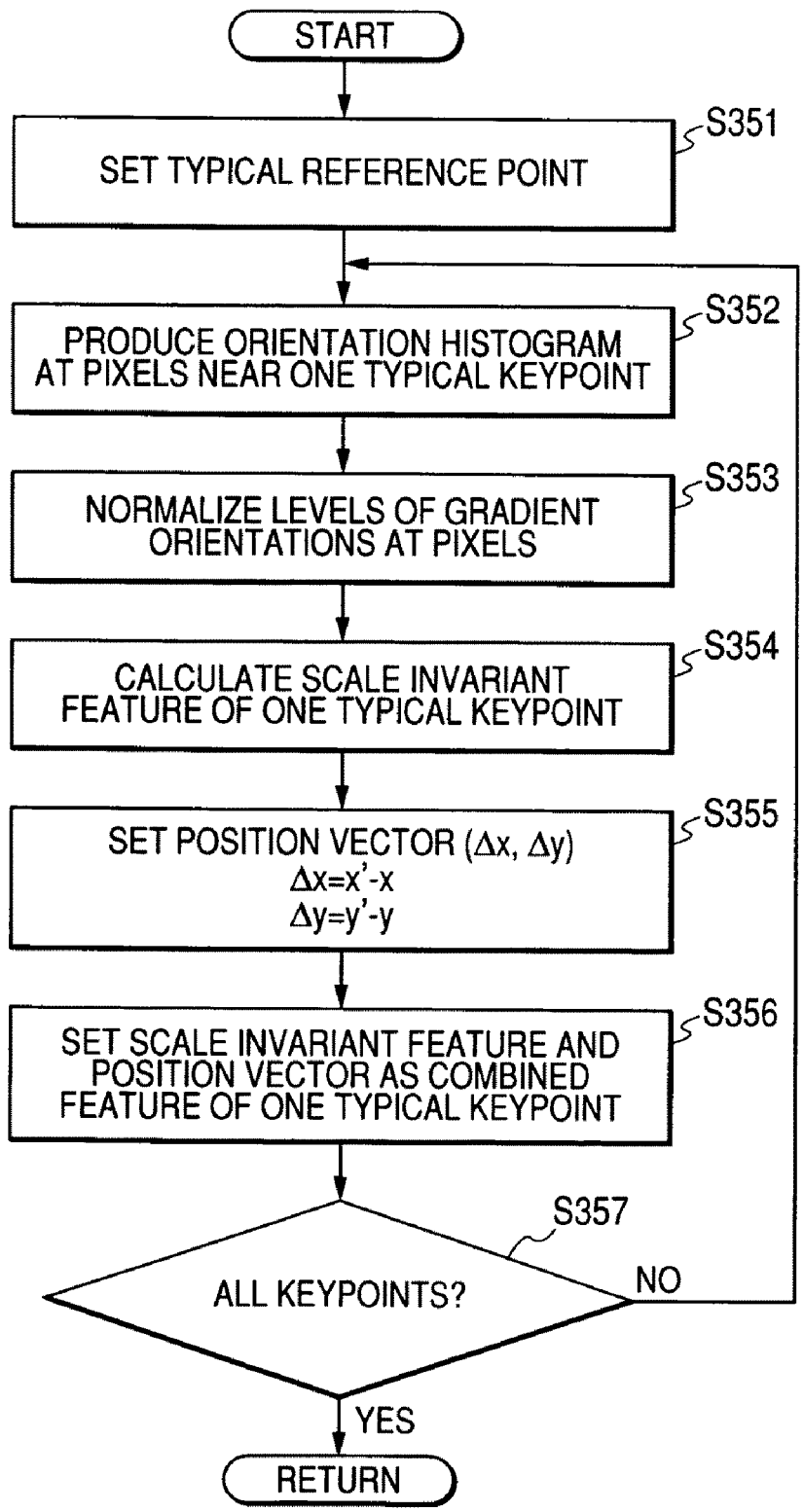
FIG. 7 is a flow chart showing a process for calculating features of respective keypoints in one typical image according to the first embodiment.

FIG. 7 is a flow chart showing a typical image feature calculating process. As shown in FIG. 7, when the block 24 initiates this process, at step S351, a typical reference point is set at a location of an arbitrary pixel in a typical image. Then, at steps S352, S353 and S354, a scale invariant feature of one typical keypoint in the typical image is calculated in the same manner as in the object feature calculating process (steps S310 to S330) for the input image.

Figure 8:
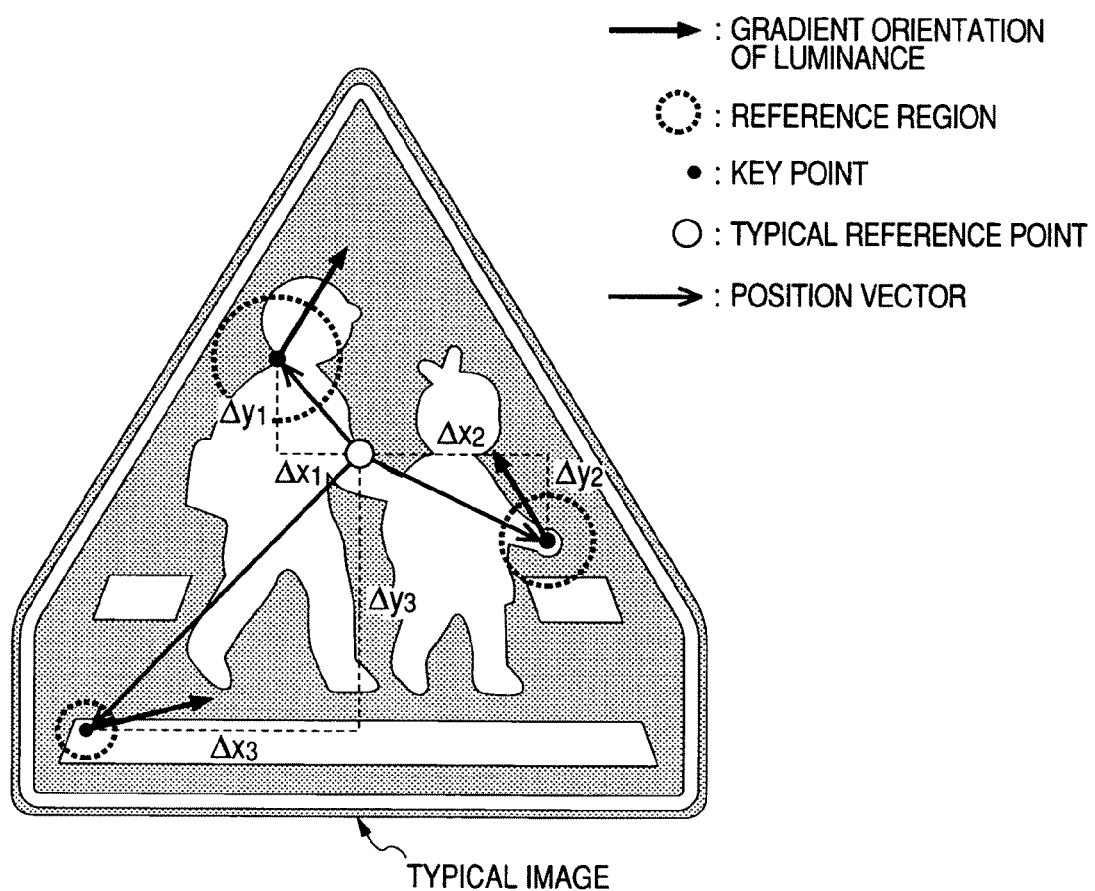
FIG. 8 is an explanatory view showing a position vector directing from a typical reference point to each of three keypoints in a typical image.

FIG. 8 is an explanatory view showing a position vector directing from the typical reference point to each of three keypoints in one typical image. As shown in FIG. 8, for example, a position vector is directed from the typical reference point (shown by a white circle) to each of three typical keypoints (shown by black circles) in one typical image.

At step S355, the block 23 calculates differences $\Delta x$ (=x'−x) and $\Delta y$ (=y'−y) between coordinates (x',y') of the typical reference point and coordinates (x,y) of the typical keypoint, and the block 23 sets a position vector ($\Delta x, \Delta y$) of the typical keypoint as position information. The position vector directs from the typical reference point to the typical keypoint to indicate a positional difference between the typical reference point and the typical keypoint.

At step S356, the scale invariant feature calculated at step S354 and the position vector are set as a combined feature of the typical keypoint and are registered or stored in a database.

At step S357, the unit 21 judges whether or not combined features of all typical keypoints are calculated. Until the calculation of combined features of all typical keypoints is completed, a combined feature of another typical keypoint is again calculated at steps S352 to S356. Therefore, combined features of all typical keypoints in one typical image are calculated in this process. In the same manner, combined features of all typical keypoints are calculated for each of the other typical images.

Returning to FIG. 2, after the feature calculating process at step S300 is completed, the block 27 performs a corresponding point setting process at step S400 to set one typical keypoint and one object keypoint, having respective scale invariant features similar to each other, as a combination of a typical corresponding point and an object corresponding point matching with each other. In this process, each of the scale invariant features of the typical keypoints is compared with the scale invariant features of the object keypoints calculated in the block 26 for each typical image. When one scale invariant feature of one typical keypoint in one typical image is the same as or similar to one scale invariant feature of one object keypoint in the input image, the typical keypoint and the object keypoint are set as a combination of corresponding points matching with each other. This process is described in detail in the non-patent document, so that the process is briefly described.

Figure 9:
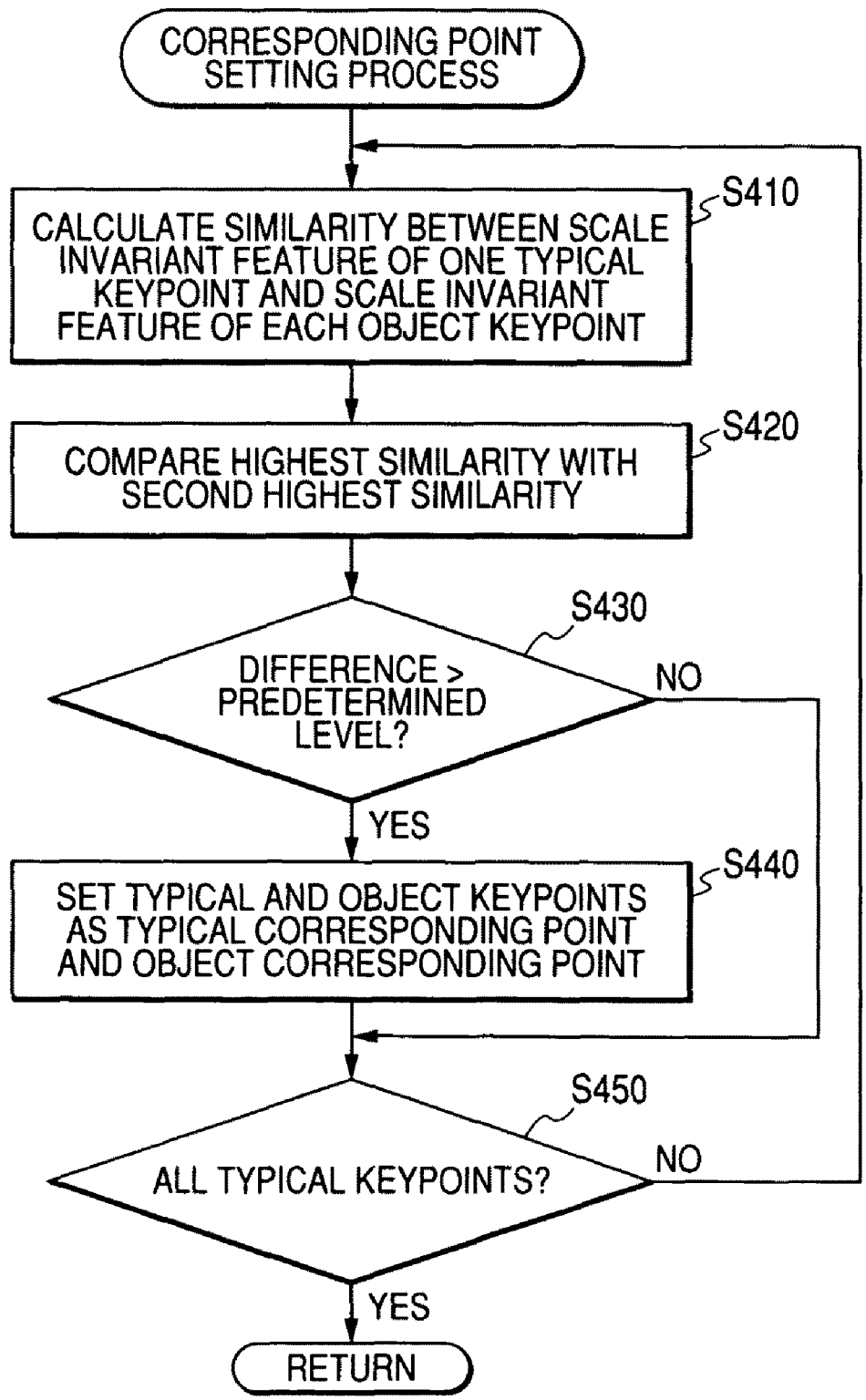
FIG. 9 is a flowchart showing a corresponding point setting process.
Figure 10:
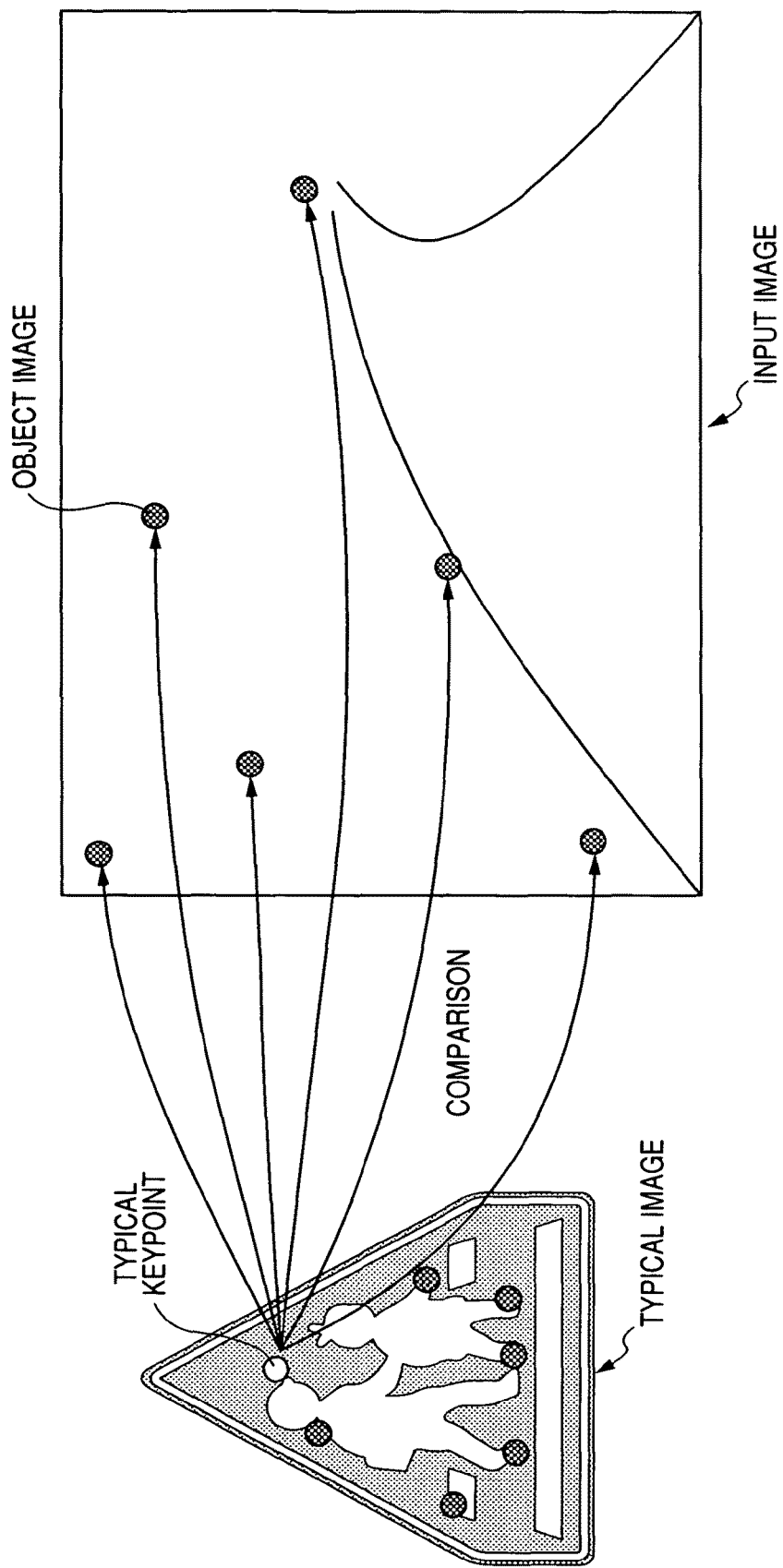
FIG. 10 is an explanatory view showing comparisons of a scale invariant feature of one typical keypoint with scale invariant features of object keypoints.

FIG. 9 is a flow chart showing the corresponding point setting process. FIG. 10 is an explanatory view showing a comparison of the scale invariant feature of one typical keypoint with the scale invariant feature of each object keypoint.

As shown in FIG. 9, when the block 27 initiates the corresponding point setting process at step S400, at step S410, a similarity between the scale invariant feature of one typical keypoint of one typical image and the scale invariant feature of each object keypoint of the input image is calculated. For example, as shown in FIG. 10, the scale invariant feature of one typical keypoint of a pedestrian crossing sign representing a typical image is compared with the scale invariant feature of each object keypoint of the input image, and a similarity between the features is calculated.

More specifically, it is assumed that M typical keypoints are extracted from one typical image, while N object keypoints are extracted from the input image. A scale invariant feature $S_{temp}^{m}$ of the m-th ($1 \leq m \leq M$) typical keypoint is expressed according to a formula (9), and a scale invariant feature $W_{input}^{n}$ of the n-th ($1 \leq n \leq N$) object keypoint is expressed according to a formula (10).

$$S_{temp}^{m} = (s_1^m, s_2^m, K, s_{128}^m) \qquad (9)$$

$$W_{input}^{n} = (w_1^n, w_2^n, K, w_{128}^n) \qquad (10)$$

A similarity n' between the feature $S_{temp}^{m}$ of the m-th typical keypoint and the feature $W_{input}^{n}$ of each object keypoint is calculated according to a formula (11).

$$n' = \arg_{n \in N} \min \left( \sum_{i}^{128} \sqrt{(s_i^m - w_i^n)^2} \right) \qquad (11)$$

That is, similarities between the feature of a remarked typical keypoint and the features of all object keypoints can be calculated, and a set of the remarked typical keypoint and one object keypoint having the highest level of similarity (i.e., typical keypoint and object keypoint having the features most similar to each other) and another set of the remarked typical keypoint and one object keypoint having the second highest level of similarity (i.e., typical keypoint and object keypoint having the features second-most similar to each other) can be determined.

At step S420, the highest level of similarity is compared with the second highest level of similarity. At step S430, the block 27 judges whether or not a difference between the highest level of similarity and the second highest level of similarity is more than a predetermined level. When the difference is more than the predetermined level, the block 27 judges that the feature of the object keypoint having the highest level of similarity to the remarked typical keypoint is similar to the feature of the remarked typical keypoint. Therefore, at step S440, the block 27 sets the remarked typical keypoint and the object keypoint having the highest level of similarity as a combination of a typical corresponding point and an object corresponding point matching with each other. In contrast, in case of the negative judgment, the block 27 judges that no object keypoint has relation to the remarked typical keypoint, and the procedure jumps to step S450.

At step S450, the block 27 judges whether or not each of the scale invariant features of all typical keypoints in the typical images has been compared with the scale invariant features of all object keypoints. In case of the negative judgment, the corresponding point setting process is again performed at steps S410 to S440. In contrast, in case of the affirmative judgment, the corresponding point setting process at step S500 is completed.

Figure 11:
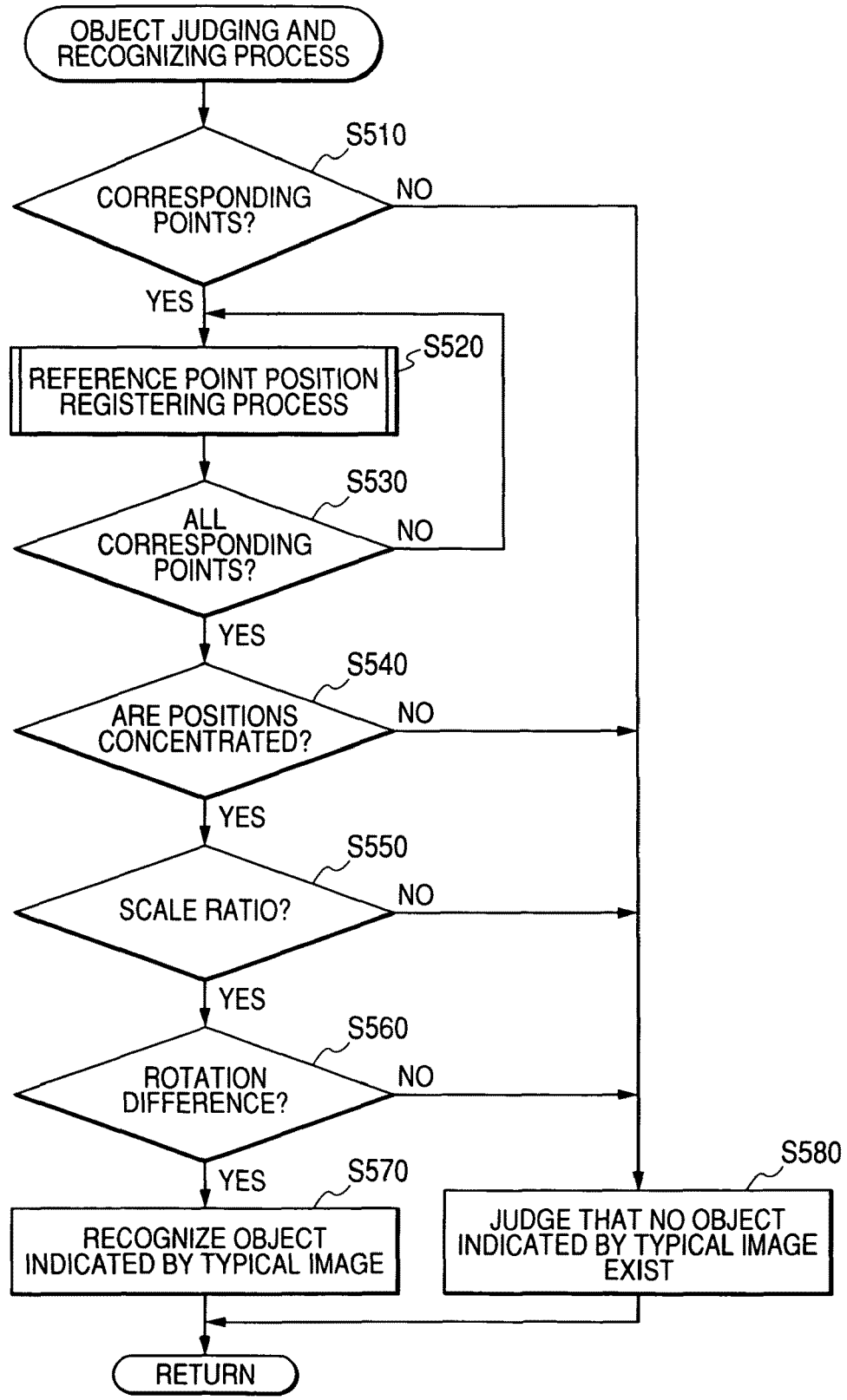
FIG. 11 is a flow chart showing an object judging and recognizing process according to the first embodiment.

Returning to FIG. 2, at step S500, the block 28 performs an object judging and recognizing process. In this process, the block 28 judges based on all combinations of corresponding points whether or not at least one object matching with one typical image exists in the input image. FIG. 11 is a flowchart showing the object judging and recognizing process, FIG. 12 is a flow chart showing an object reference point position registering process in the object judging and recognizing process, and FIG. 13 is an explanatory view showing a method for calculating a position of an object reference point in the input image.

As shown in FIG. 11, at step S510, the block 28 judges whether or not at least one object corresponding point exists in the input image. In case of the affirmative judgment, at step S520, the block 28 performs a reference point position registering process. Assuming that an object matching with the typical image exists in the input image, an object reference point corresponding to the typical reference point of the typical image exists in the inputted image. In this process, a position of the object reference point is calculated for each object corresponding point.

Figure 12:
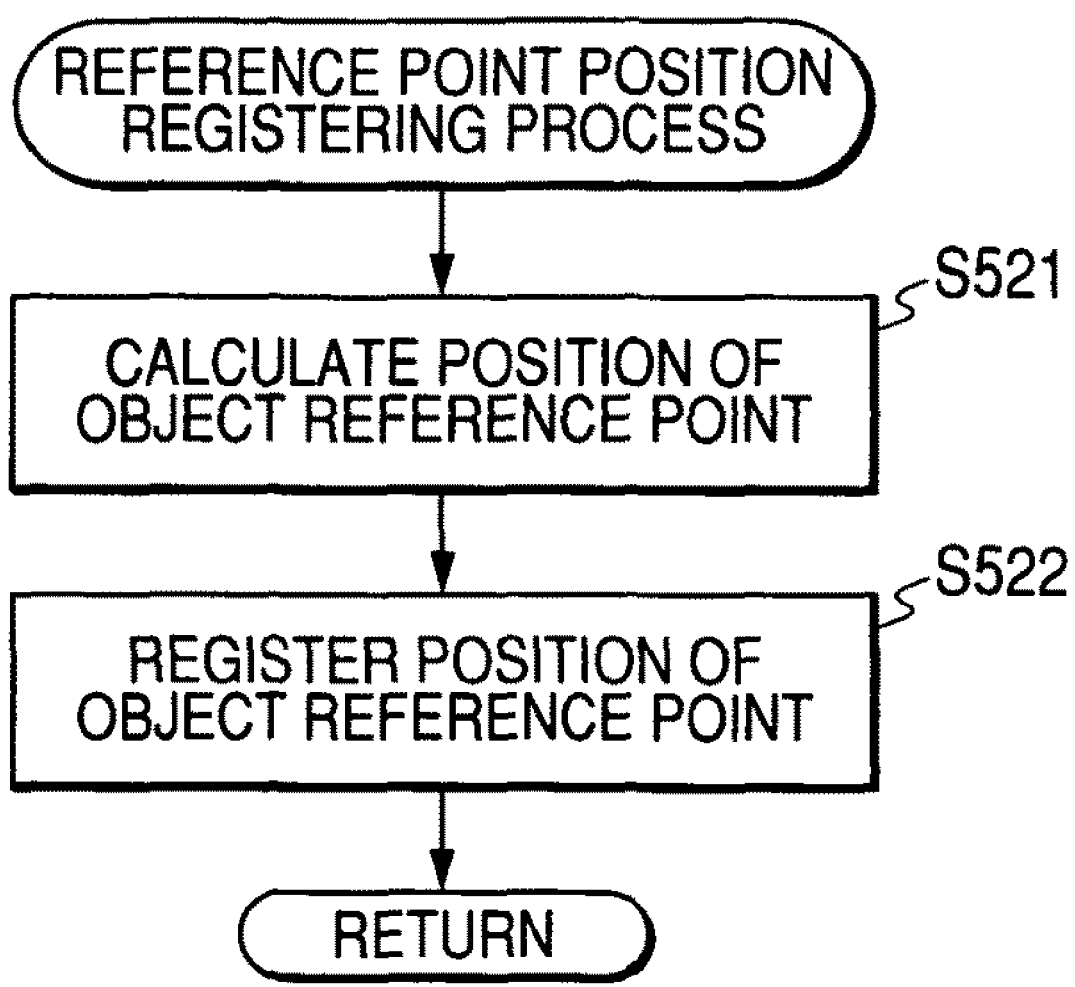
FIG. 12 is a flow chart showing an object reference point position registering process in the process shown in FIG. 11.

More specifically, as shown in FIG. 12, at step S521, the block 28 detects a position of the object corresponding point, not yet used for the reference point position registering process, in a coordinate plane of the input image. Then, the block 28 calculates a position of an object reference point in the coordinate plane of the input image from the detected position of the object corresponding point and the position vector of the typical corresponding point matching with the object corresponding point.

Figure 13:
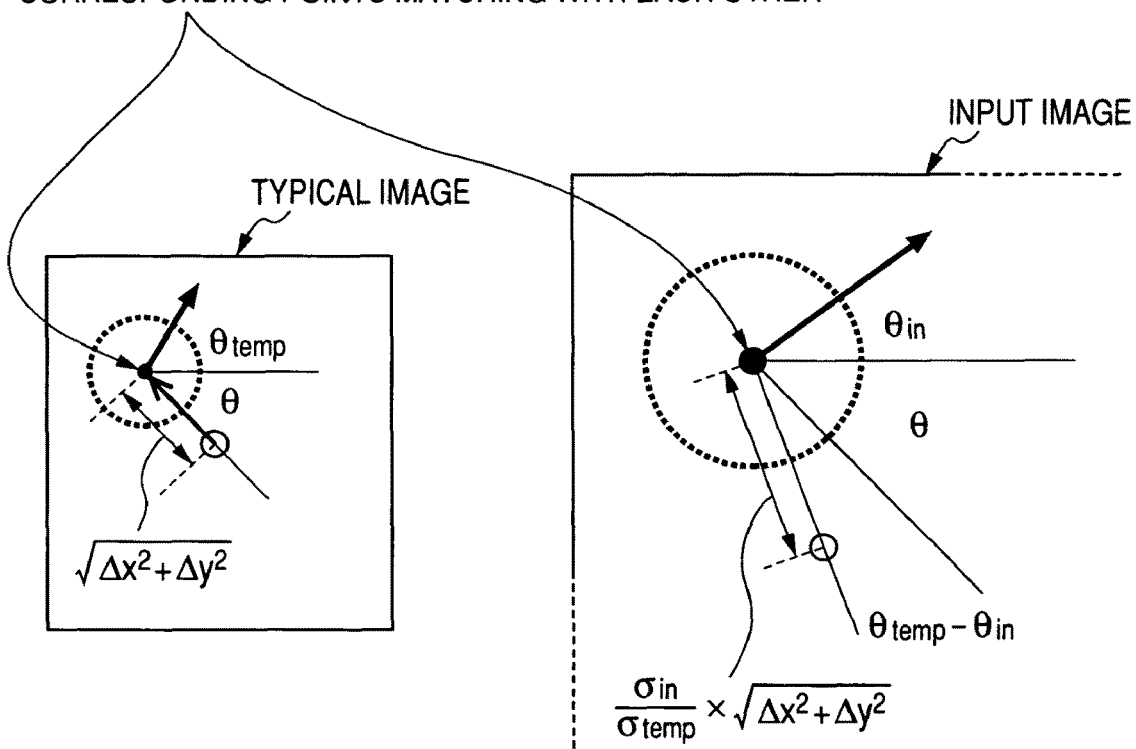
FIG. 13 is an explanatory view showing the calculation of a position of an object reference point in the process shown in FIG. 12.

For example, as shown in FIG. 13, a distance D1 between the typical reference point and one typical corresponding point in one typical image is calculated according to a formula (12).

$$D1 = \sqrt{\Delta x^2 + \Delta y^2} \tag{12}$$

$\Delta x$ and $\Delta y$ are elements of the position vector of the typical corresponding point. Here, the feature of each typical corresponding point contains the position vector $(\Delta x, \Delta y)$, a scale $\sigma$ temp of the typical image, rotation information $\theta$ temp indicating the representative gradient orientation of the typical corresponding point. The feature of each object corresponding point contains coordinates (ain, bin) of the point in the input image, a scale $\sigma$ in of the input image and rotation information $\theta$ in indicating the representative gradient orientation of the object corresponding point. By using the scales $\sigma$ in and $\sigma$ temp, a distance D2 in the input image between an object reference point corresponding to the typical reference point and the object corresponding point matching with the typical corresponding point is calculated according to a formula (13).

$$D2 = \frac{\sigma_{in}}{\sigma_{temp}} \times \sqrt{\Delta x^2 + \Delta y^2} \tag{13}$$

A term $\sigma$ in/$\sigma$ temp compensates a scale difference between the images for the distance D2. Further, because there is a rotation difference $\theta$ temp $-\theta$ in between the gradient orientations of the corresponding points, the object reference point is rotated around the object corresponding point by the rotation difference $\theta$ temp $-\theta$ in. In this case, a position (X,Y) of the object reference point in a coordinate plane of the input image are calculated according to formulas (14), (15) and (16).

$$X = a_{in} + \frac{\sigma_{in}}{\sigma_{temp}} \times \sqrt{\Delta x^2 + \Delta y^2} \times \cos(\theta + \theta_{temp} - \theta_{in}) \tag{14}$$

$$Y = b_{in} - \frac{\sigma_{in}}{\sigma_{temp}} \times \sqrt{\Delta x^2 + \Delta y^2} \times \sin(\theta + \theta_{temp} - \theta_{in}) \tag{15}$$

$$\theta = \arctan\left(\frac{\Delta y}{\Delta x}\right) \tag{16}$$

The symbol $\theta$ in the formula (16) indicates the orientation of the position vector of the typical corresponding point. Therefore, the position (X,Y) of the object reference point is determined from the position vector of the typical corresponding point while considering the scale difference and the rotation difference between the images.

At step S522, the block 28 registers, in a database, the position (X,Y) of the object reference point to cast a vote.

Returning to FIG. 11, at step S530, the block 28 judges whether or not the reference point position registering process for all object corresponding points has been finished. In case of the negative judgment, the process at step S520 is again performed. When the process for all object corresponding points is finished, the positions of the object reference point are obtained.

At step S540, the block 28 judges whether or not the positions of the object reference point are concentrated in a narrow region at a level of concentration (or concentration magnitude) higher than a predetermined concentration value.

If an object picture matching with the typical image exists in the input image, a positional relationship among the object corresponding points becomes similar to a positional relationship among the typical corresponding points. This similarity is obtained even when there is a scale difference or a rotation difference between the object picture and the typical image. Therefore, the positions of the object reference point are concentrated in a narrow region of the coordinate plane. In contrast, if no object picture matching with the typical image exists in the input image, a positional relationship among the object corresponding points is differentiated from a positional relationship among the typical corresponding points. Therefore, the positions of the object reference point are scattered in a wide region of the coordinate plane.

Figure 14A:
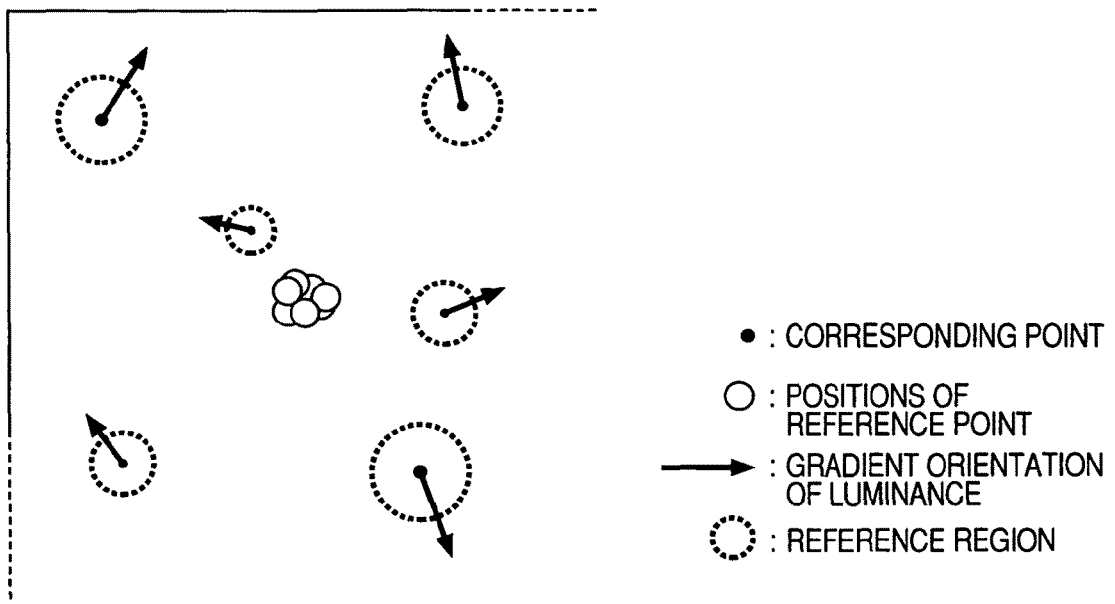
FIG. 14A is an explanatory view showing positions of the object reference point concentrated in a narrow region.
Figure 14B:
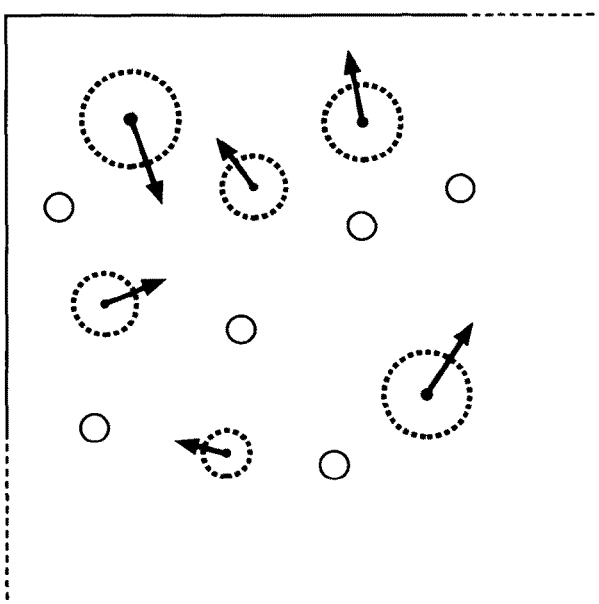
FIG. 14B is an explanatory view showing positions of the object reference point scattered in a wide region.

FIG. 14A is an explanatory view showing the positions of the object reference point concentrated in a narrow region, while FIG. 14B is an explanatory view showing the positions of the object reference point scattered in a wide region. For example, when the positions of the object reference point shown in FIG. 14A are obtained, an object picture matching with the typical image may exist in the input image at a high probability. In contrast, when the positions of the object reference point shown in FIG. 14B are obtained, an object picture matching with the typical image may hardly exist in the input image.

Figure 15:
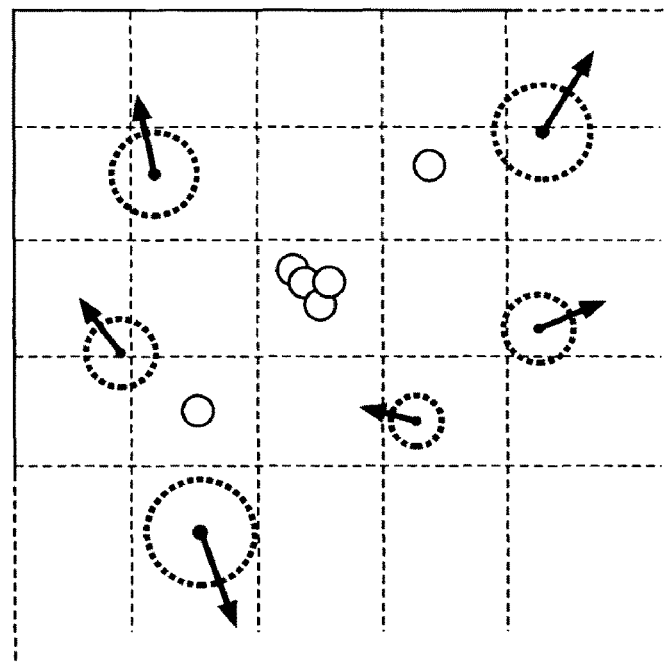
FIG. 15 is an explanatory view showing positions of the object reference point in small regions of a coordinate plane of the input image.

Returning to FIG. 11, in case of the affirmative judgment at step S540, the procedure proceeds to step S550. FIG. 15 is an explanatory view showing the positions of the object reference point in a plurality of small regions set by dividing the coordinate plane of the input image. For example, as shown in FIG. 15, when the positions of the object reference point are concentrated in one small region at a level of concentration higher than a predetermined concentration value, the block 28 makes the affirmative judgment at step S540.

At step S550, the block 28 judges whether or not a scale ratio $\sigma$ in/$\sigma$ temp between the input image and the typical image is placed within a predetermined range. In case of the affirmative judgment, at step S560, the block 28 judges whether or not the rotation difference $\theta$ temp $-\theta$ in between the input image and the typical image is placed within a predetermined range. In case of the affirmative judgment, at step S570, the block 28 judges that an object picture having the object corresponding points in the input image matches with the typical image, so that the block 28 recognizes the object picture existing in the input image as an object indicated by the typical image. Then, the object judging and recognizing process is completed.

In contrast, in case of the negative judgment at step S510, S540, S550 or step S560, the block 28 judges at step S580 that an object picture having the object corresponding points in the input image does not match with the typical image. That is, the block 28 recognizes no object indicated by the typical image. This object judging and recognizing process is performed for each of the typical images. When this process is finished, the image recognition process (see FIG. 2) is completed.

As described above, in the sign recognition apparatus 1 representing the object recognition apparatus, the block 22 extracts in advance a plurality of typical keypoints from a typical image. The block 23 sets a typical reference point in the typical image and calculates a position vector indicating a positional difference between the typical reference point) and each typical keypoint, in addition to a scale invariant feature at each typical keypoint. When the image processing unit 21 receives an input image, the block 25 extracts a plurality of object keypoints from the input image, and the block 26 calculates a scale invariant feature at each object keypoint. The block 27 compares the feature of each typical keypoint with the features of the object keypoints and sets each pair of one typical keypoint and one object keypoint having the respective features similar to each other as a combination of typical corresponding point and object corresponding point. The block 28 determines a position of an object reference point corresponding to the typical reference point from the position of one object corresponding point and the position vector of the typical corresponding point matching with the object corresponding point for each object corresponding point. When the positions of the object reference point are placed in a narrow region, the block 28 realizes that a positional relationship among the object corresponding points extracted from the input image is substantially similar to a positional relationship among the typical corresponding points extracted from the typical image, and the block 28 judges that an object picture matching with the typical image exists in the input image. Therefore, the block 28 recognizes the object picture as an object indicated by the typical image.

In the prior art, when the number of keypoints in an input image matching with keypoints in a typical image is large, it is judged that an object picture matching with the typical image exists in the input image. Therefore, to reliably recognize an object indicated by the typical image, many keypoints of the input image matching with keypoints of the typical image are necessary. In contrast, in this embodiment, even when the number of object corresponding points extracted from the input image is small, the apparatus 1 can reliably determine a positional relationship among the object corresponding points, and the apparatus 1 can reliably judge whether or not a positional relationship among the object corresponding points is substantially similar to a positional relationship among the typical corresponding points matching with the object corresponding points. That is, even when the number of object corresponding points is small, positions of the object reference point are sufficiently concentrated in a small region when an object picture matching with one of typical images exists in the input image. Accordingly, the apparatus can judge the existence of an object indicated by the typical image in the input image, and the apparatus can reliably recognize the object picture as the object.

Further, the feature of each object keypoint is invariant to image scaling (i.e., enlargement and reduction) and rotation. Accordingly, the apparatus can reliably recognize the object, regardless of the scale or rotation of the object in the input image.

In the first embodiment, a position vector of each typical keypoint indicating a positional difference between the typical reference point and the typical keypoint is set as position information of the typical keypoint and is added to the scale invariant feature of the typical keypoint (see FIG. 7) to indirectly indicate a position of the typical keypoint in the typical image and to determine a positional relationship among the typical corresponding points. However, the present invention should not be limited to the position vector of the typical keypoint, but information directly or indirectly indicating a position of each typical keypoint in the typical image may be useful for the apparatus 1.

Further, the judgment (step S540 in FIG. 11) whether or not the positions of the object reference point are concentrated in a narrow region is performed for each of the typical images by using the fixed predetermined concentration value. However, a predetermined concentration value may changeably be set for each typical image. For example, a predetermined concentration value may be set according to the number of typical keypoints. That is, as the number of typical keypoints is increased, the predetermined concentration value may be heightened.

Modification

In the first embodiment, before the reference point position registering process at step S520 (see FIG. 11), the apparatus 1 regularly and fixedly divides the coordinate plane of the input image into a plurality of small regions (see FIG. 15), regardless of positions of the object reference point. However, a plurality of small regions may be set in connection with positions of the object reference point during the reference point position registering process.

Figure 17:
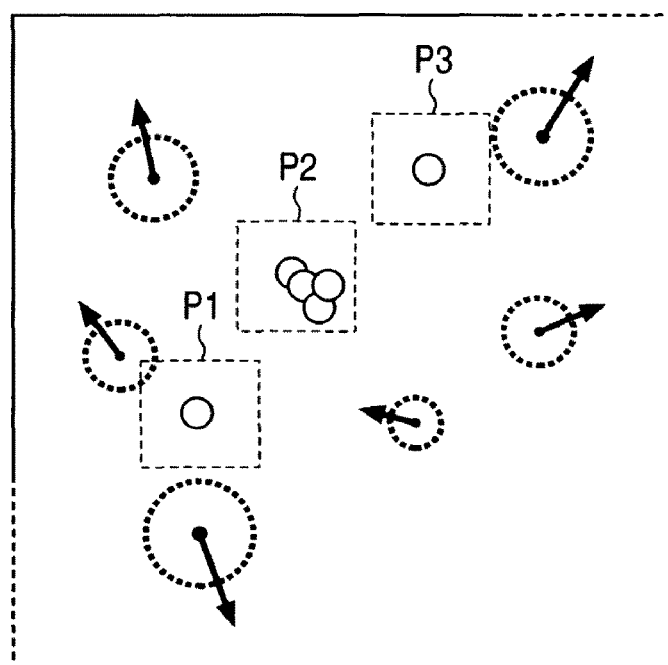
FIG. 17 is an explanatory view showing three small regions set to place a group of positions or a position of an object reference point in each small region in the process shown in FIG. 16.
Figure 16:
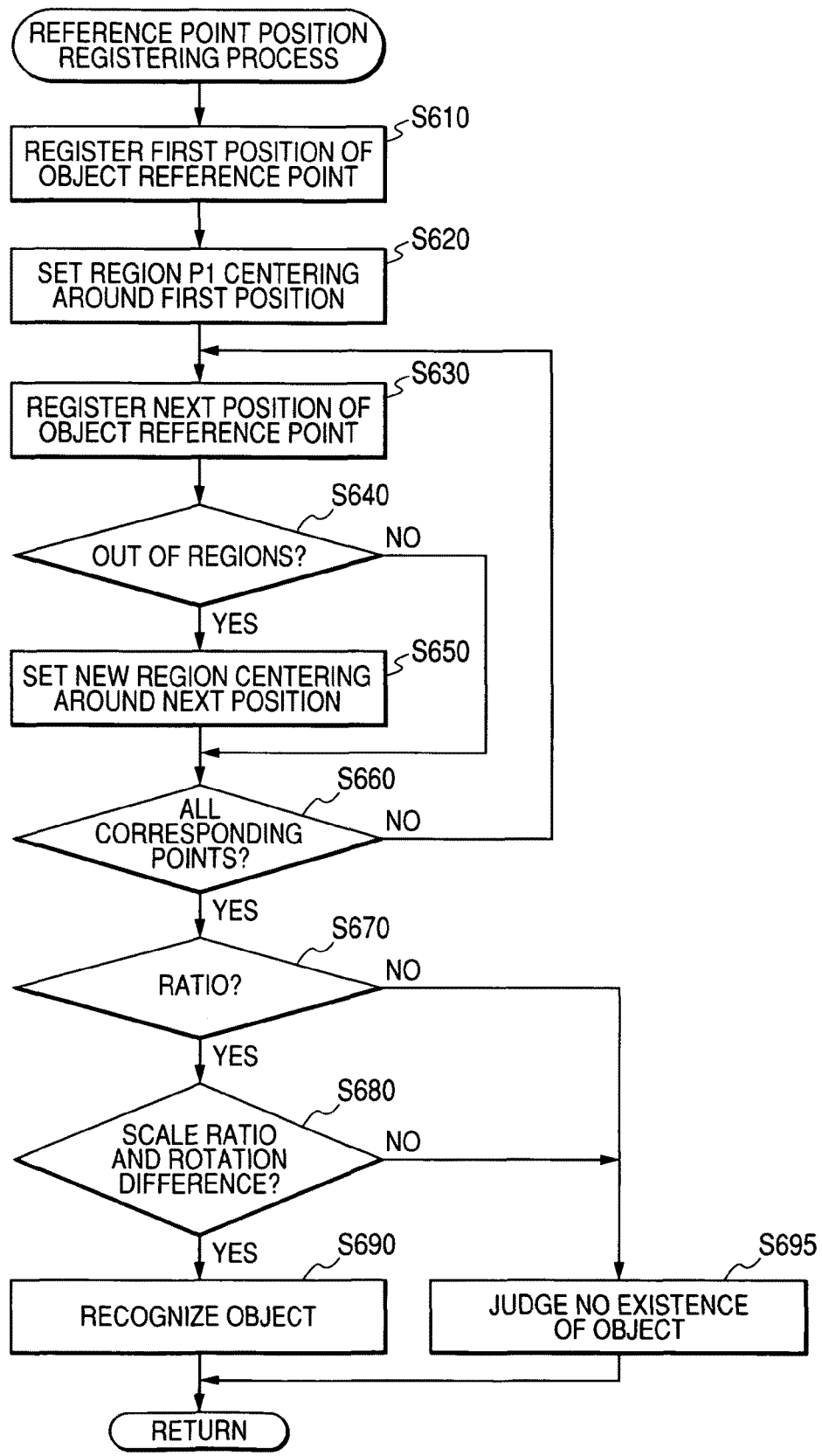
FIG. 16 is a flow chart showing an object reference point position registering process according to a modification of the first embodiment.

FIG. 16 is a flow chart showing an object reference point position registering process according to a modification of the first embodiment. FIG. 17 is an explanatory view showing three small regions set to place a group of positions or a position of an object reference point in each small region.

In this modification, as shown in FIG. 16, when the reference point position registering process is initiated, at step S610, the block 28 calculates a first position (X,Y) of the object reference point from the position of a first object corresponding point and the position vector of the typical corresponding point matching with the first object corresponding point according to the formulas (14) and (15), and registers the first position. At step S620, a first small region P1 centering around the first position is set in the coordinate plane of the input image. At step S630, a next position of the object reference point is registered. At step S640, the block 28 judges whether or not the next position recently registered is placed out of one of previously-set small region(s) including the region P1. When the next position is placed out of the previously-set small region(s), at step S650, a new small region centering around the next position is set. In contrast, in case there is a negative judgment, no small region is newly set, and the procedure jumps to step S660.

For example, as shown in FIG. 17, the second position of the object reference point is placed out of the first small region P1, so that a second small region P2 centering around the second position is set. Three other positions of the object reference point are placed within the region P2, so that no small region is newly set for the other three positions. Further, another position of the object reference point is placed out of the first and second small regions P1 and P2, so that a third small region P3 centering around the position is set.

Returning to FIG. 16, at step S660, the block 28 judges whether or not positions of the objective reference point calculated from all objective corresponding points are registered. In case of the negative judgment, the procedure returns to step S630. In contrast, in case of the affirmative judgment, at step S670, the block 28 judges whether or not the number of positions of the object reference point in one of the small regions exceeds a predetermined ratio to the number of all object corresponding points of the input image. In case of the affirmative judgment, the same judging processes as those at steps S550 and S560 shown in FIG. 11 are performed at step S680. In case of the affirmative judgment at step S680, the same process as that at step S570 shown in FIG. 11 is performed at steps S690. In contrast, in case of the negative judgment at step S680, the same process as that at step S580 shown in FIG. 11 is performed at steps S695.

Therefore, the apparatus 1 can recognize the object picture as an object indicated by the typical image when the object picture exists in the input image.

Embodiment 2

In this embodiment, no reference point is set in the typical image, but the block 24 sets typical position vectors indicating relative positions of each typical feature point to the other typical feature points as the position information of the typical feature point, and the block 28 calculates object position vectors indicating relative positions of each object corresponding point to the other object corresponding points. The block 28 determines the positional relationship among the typical corresponding points from the typical position vectors of the typical corresponding points and determines the positional relationship among the object corresponding points from the object position vectors of the object corresponding points. Then, the block 28 judges whether or not the relationships are substantially similar to each other. If an object picture matching with a typical image exists in the input image, the relationships become similar to each other. This similarity is obtained even when there is a scale difference or a rotation difference between the object picture and the typical image. When the block 28 judges that the relationships are substantially similar to each other, the block 28 recognizes an object picture having the object corresponding points as an object indicated by the typical image.

For example, the block 28 selects three of the typical corresponding points and sets a typical triangle determined by the three typical corresponding points. The block 28 also sets an object triangle determined by three object corresponding points matching with the three typical corresponding points. The positional relationship among the typical corresponding points is represented by a figure of the typical triangle, and the positional relationship among the object corresponding points is represented by a figure of the object triangle. Then, the block 28 judges based on the typical position vectors of the three typical corresponding points and the object position vectors of the three object corresponding points whether or not the object triangle is substantially similar to the typical triangle. When the object triangle is substantially similar to the typical triangle, the block 28 recognizes an object picture having the object triangle in the input image as an object indicated by the typical image.

Figure 18:
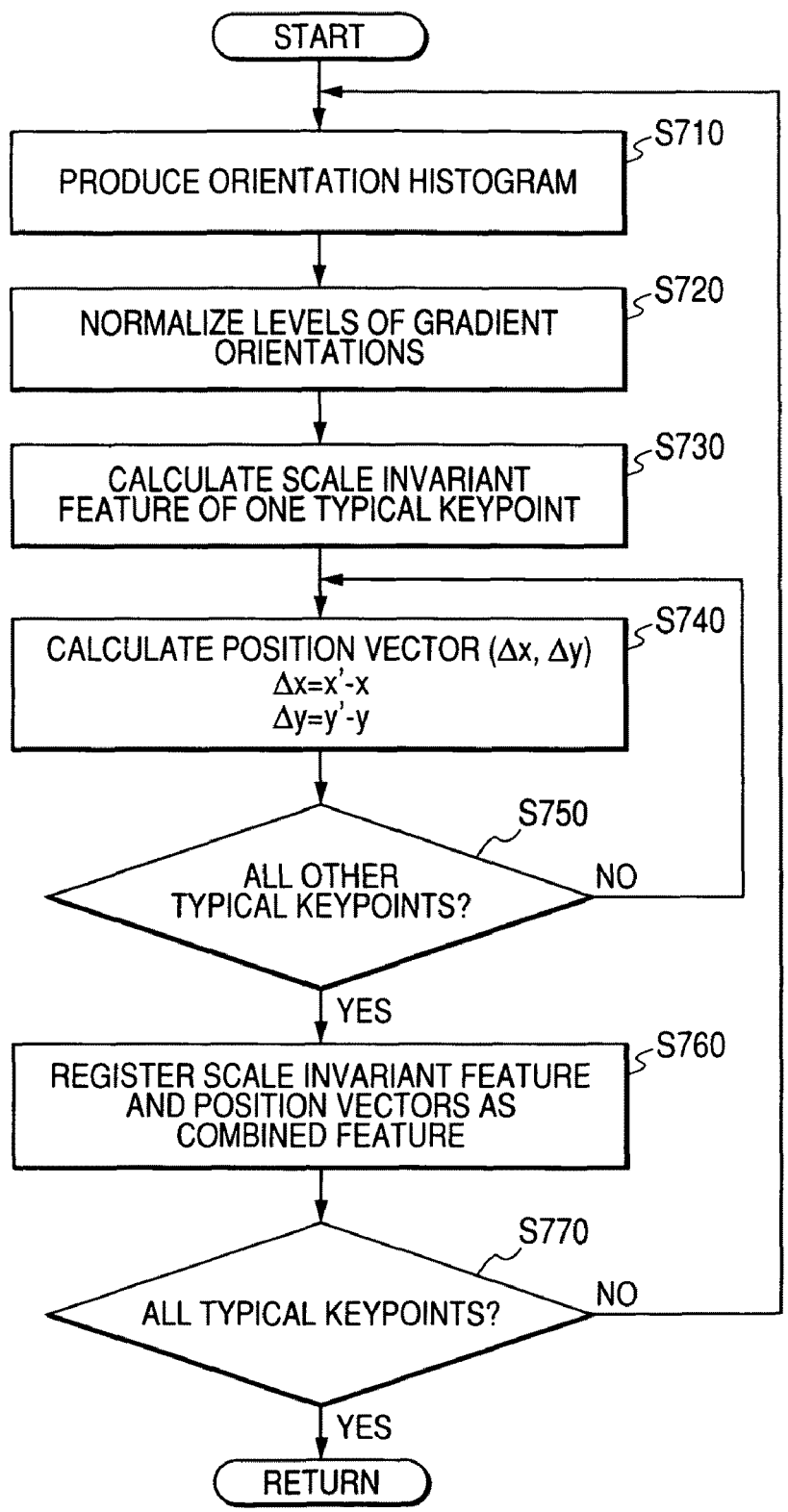
FIG. 18 is a flow chart showing a typical image feature calculating process for one typical image according to the second embodiment.

FIG. 18 is a flow chart showing a typical feature calculating process for one typical image according to the second embodiment. As shown in FIG. 18, when the blocks 23 and 24 initiate a typical feature calculating process, the block 23 calculates a scale invariant feature of one typical keypoint in one typical image at steps S710, S720 and S730 in the same manner as at steps S352 to S354 of the process shown in FIG. 7. Then, at step S740, the block 24 calculates differences Δx and Δy between coordinates (x,y) of the one typical keypoint and coordinates (x',y') of one of the other typical keypoints in the typical image to obtain a position vector (Δx,Δy) of the typical keypoint. At step S750, the block 24 judges whether or not position vectors of the typical keypoint to all other typical keypoints are obtained. In case of negative judgment, another position vector of the typical keypoint is calculated at step S740. Therefore, all position vectors of the typical keypoint are finally obtained as positional information of the typical keypoint.

Figure 19:
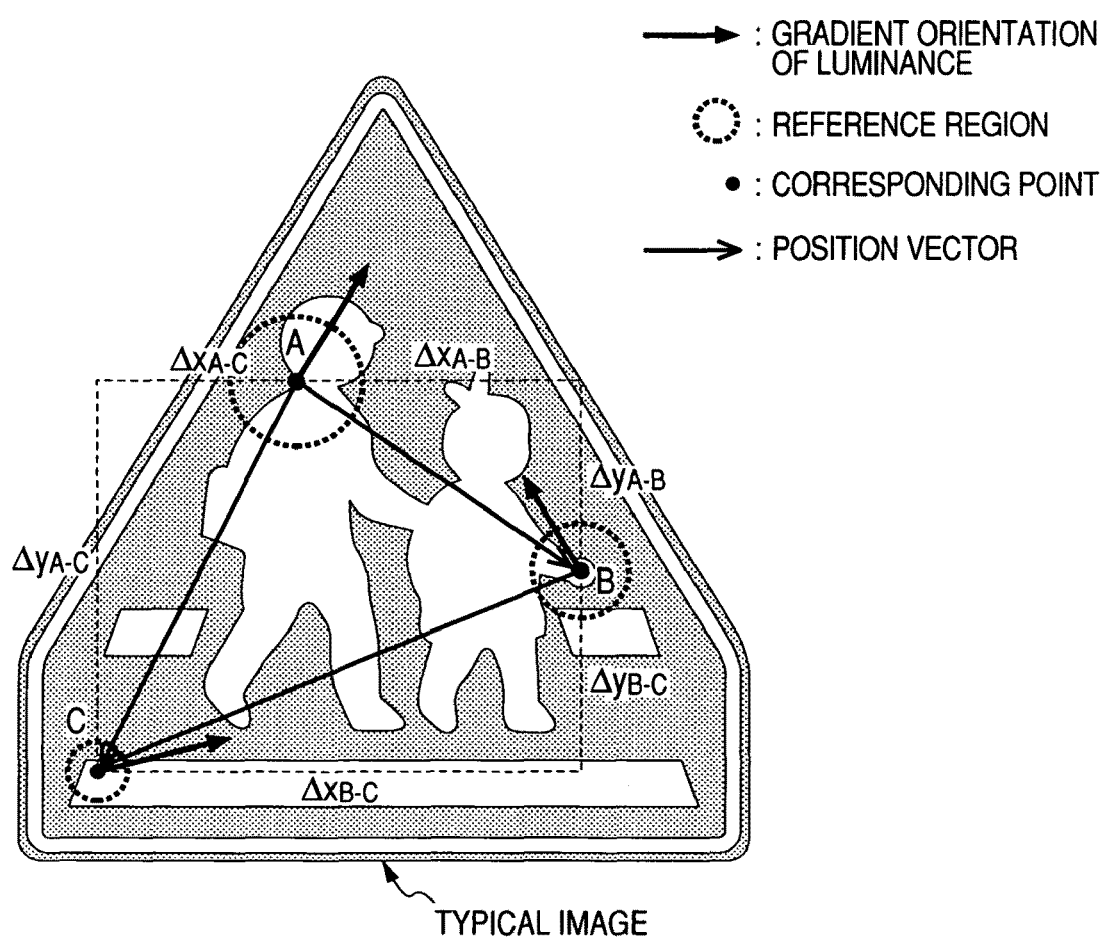
FIG. 19 is an explanatory view showing a position vector between two typical keypoints in each pair in the process shown in FIG. 18.

FIG. 19 is an explanatory view showing a position vector between two typical keypoints in each pair among three typical keypoints of one typical image. As shown in FIG. 19, three typical keypoints A, B and C are, for example, extracted from one typical image. A position vector from one typical keypoint to each of the other typical keypoints is set for each typical keypoint. That is, a position vector from the typical keypoint A to the typical keypoint B and a position vector from the typical keypoint A to the typical keypoint C are set for the typical keypoint A. A position vector from the typical keypoint B to the typical keypoint A and a position vector from the typical keypoint B to the typical keypoint C are set for the typical keypoint B. A position vector from the typical keypoint C to the typical keypoint A and a position vector from the typical keypoint C to the typical keypoint B are set for the typical keypoint C.

Returning to FIG. 18, at step S760, the scale invariant feature and the position vectors of the typical keypoint are registered as a combined feature of the typical keypoint in a database. At step S770, the block 26 judges whether or not combined features of all typical keypoints in the typical image are calculated. In case of the negative judgment, a combined feature of another typical keypoint is calculated at steps S710 to S760. Therefore, combined features of all typical keypoints are finally calculated and registered. This process is performed for each of the other typical images in the same manner.

Figure 20:
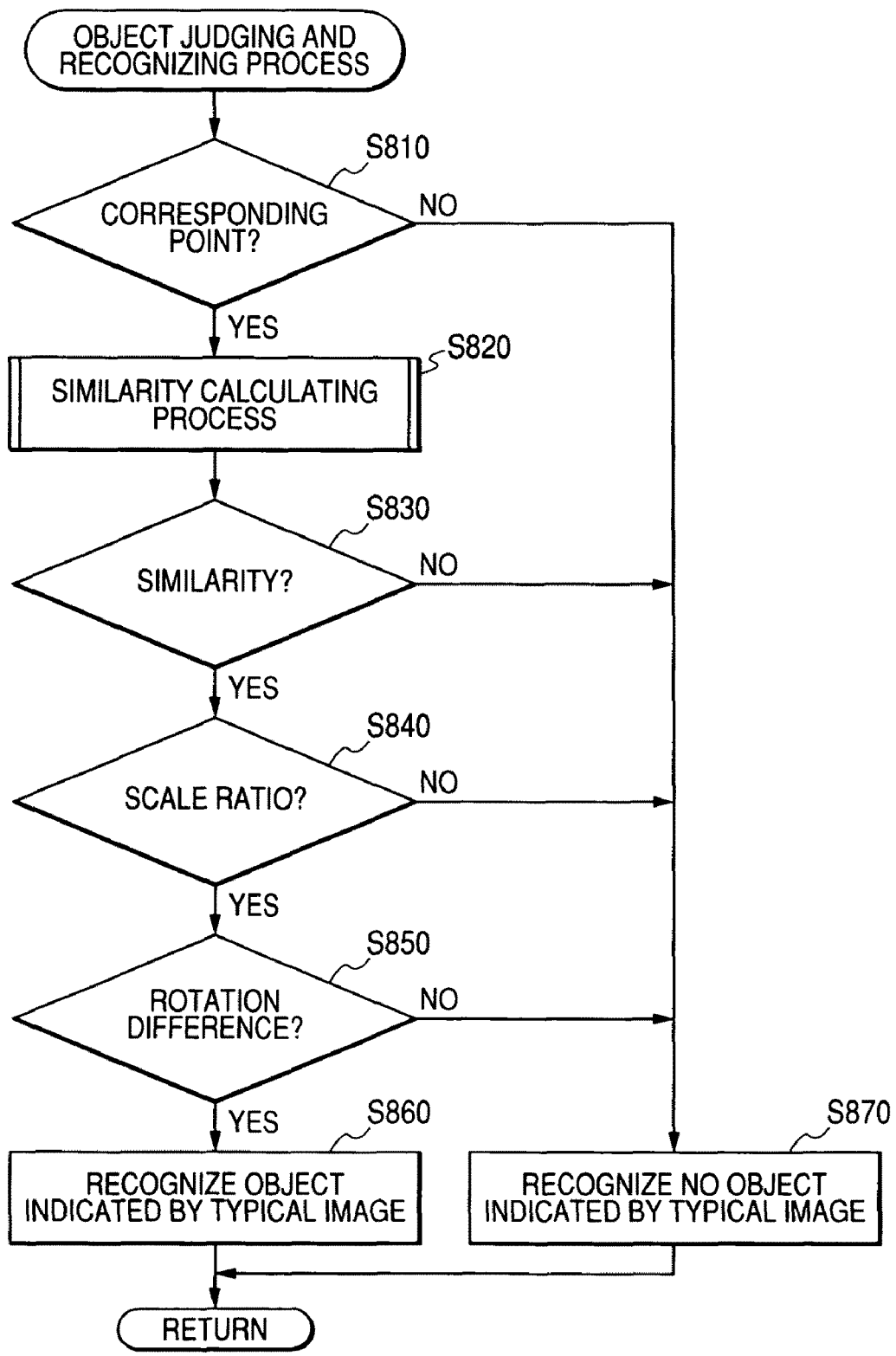
FIG. 20 is a flow chart of an object judging and recognizing process according to the second embodiment.

Thereafter, the block 28 initiates an object judging and recognizing process. FIG. 20 is a flowchart of an object judging and recognizing process according to the second embodiment.

As shown in FIG. 20, at step S810, the block 28 judges whether or not at least one object corresponding point exists in the input image. In case of the affirmative judgment, at step S820, the block 28 performs a similarity calculating process.

Figure 21:
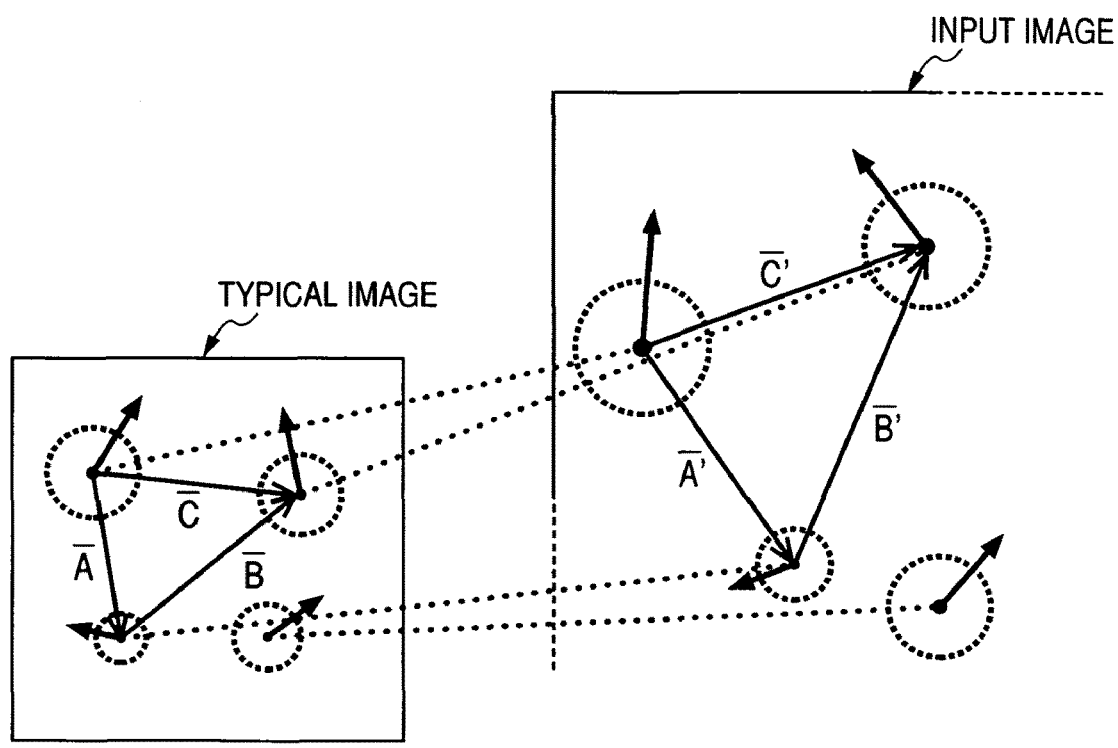
FIG. 21 is an explanatory view showing the formation of a typical triangle and an object triangle corresponding to each other.
Figure 22A:
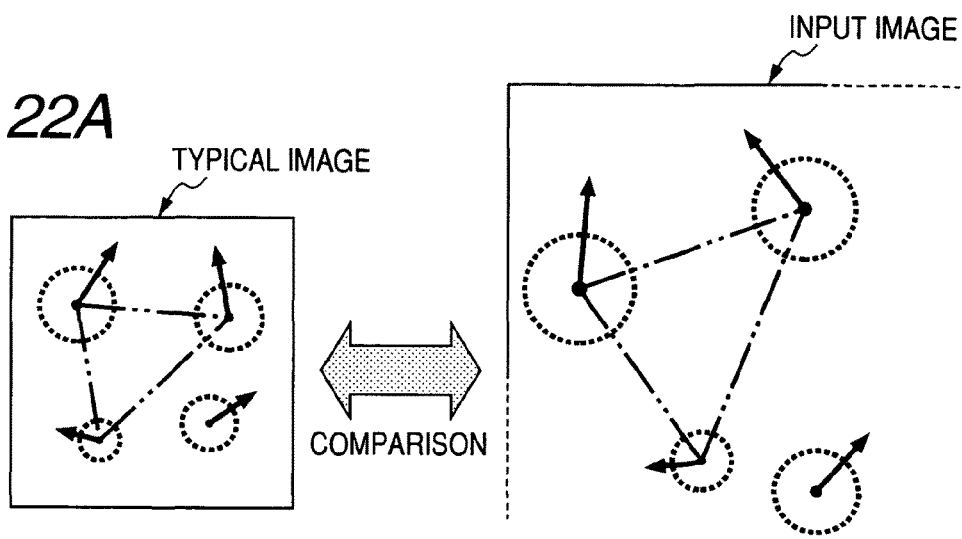
FIG. 22A shows a comparison of a typical triangle determined by a first combination of three typical corresponding points with an object triangle corresponding to the typical triangle.
Figure 22B:
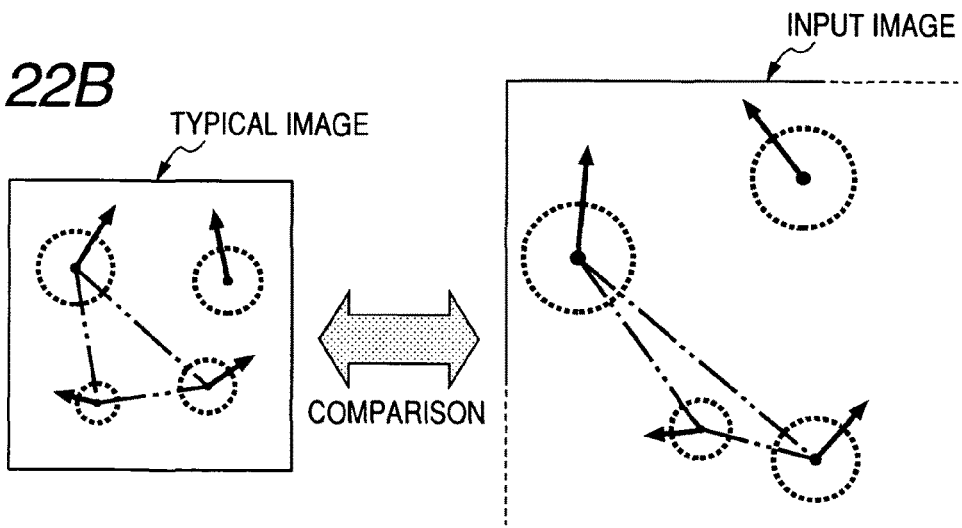
FIG. 22B shows a comparison of a typical triangle determined by a second combination of three typical corresponding points with an object triangle corresponding to the typical triangle.
Figure 22C:
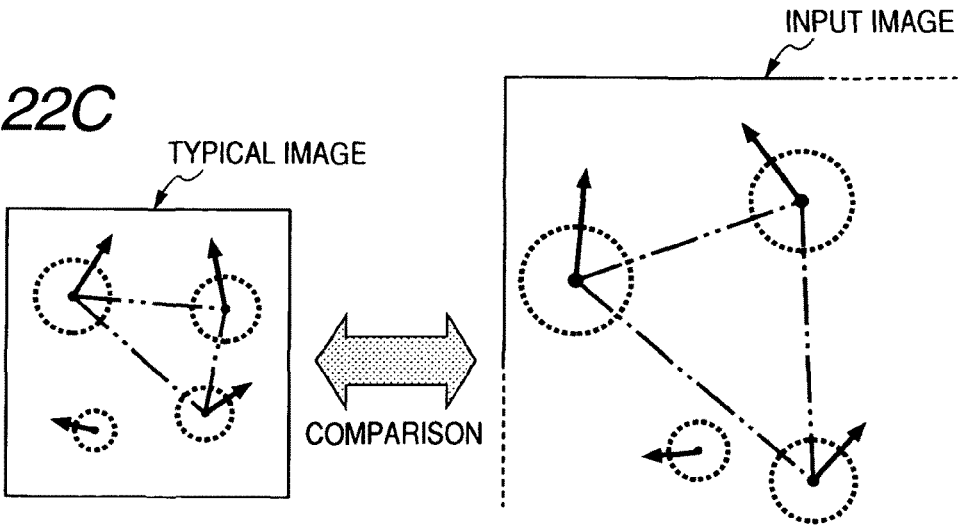
FIG. 22C shows a comparison of a typical triangle determined by a third combination of three typical corresponding points with an object triangle corresponding to the typical triangle.

FIG. 21 is an explanatory view showing the formation of a typical triangle and an object triangle corresponding to each other. FIG. 22A shows a comparison of a triangle determined by a first combination of three typical corresponding points with a triangle determined by a first combination of three object corresponding points, FIG. 22B shows a comparison of a triangle determined by a second combination of three typical corresponding points with a triangle determined by a second combination of three object corresponding points, and FIG. 22C shows a comparison of a triangle determined by a third combination of three typical corresponding points with a triangle determined by a third combination of three object corresponding points.

As shown in FIG. 21, in the similarity calculating process, a typical triangle is determined by three typical corresponding points arbitrarily selected from one typical image, and an object triangle in the input image is determined by three object corresponding points matching with the three typical corresponding points. A similarity between the triangles is calculated based on the position vectors of the corresponding points. The number of triangles determined in each image is increased with the number of corresponding points in the input image. For example, when the input image has four corresponding points, four object triangles and four typical triangles are determined. In FIG. 22A to FIG. 22C, three of the four triangles are shown as an example. The similarity is calculated for each object triangle.

Figure 23:
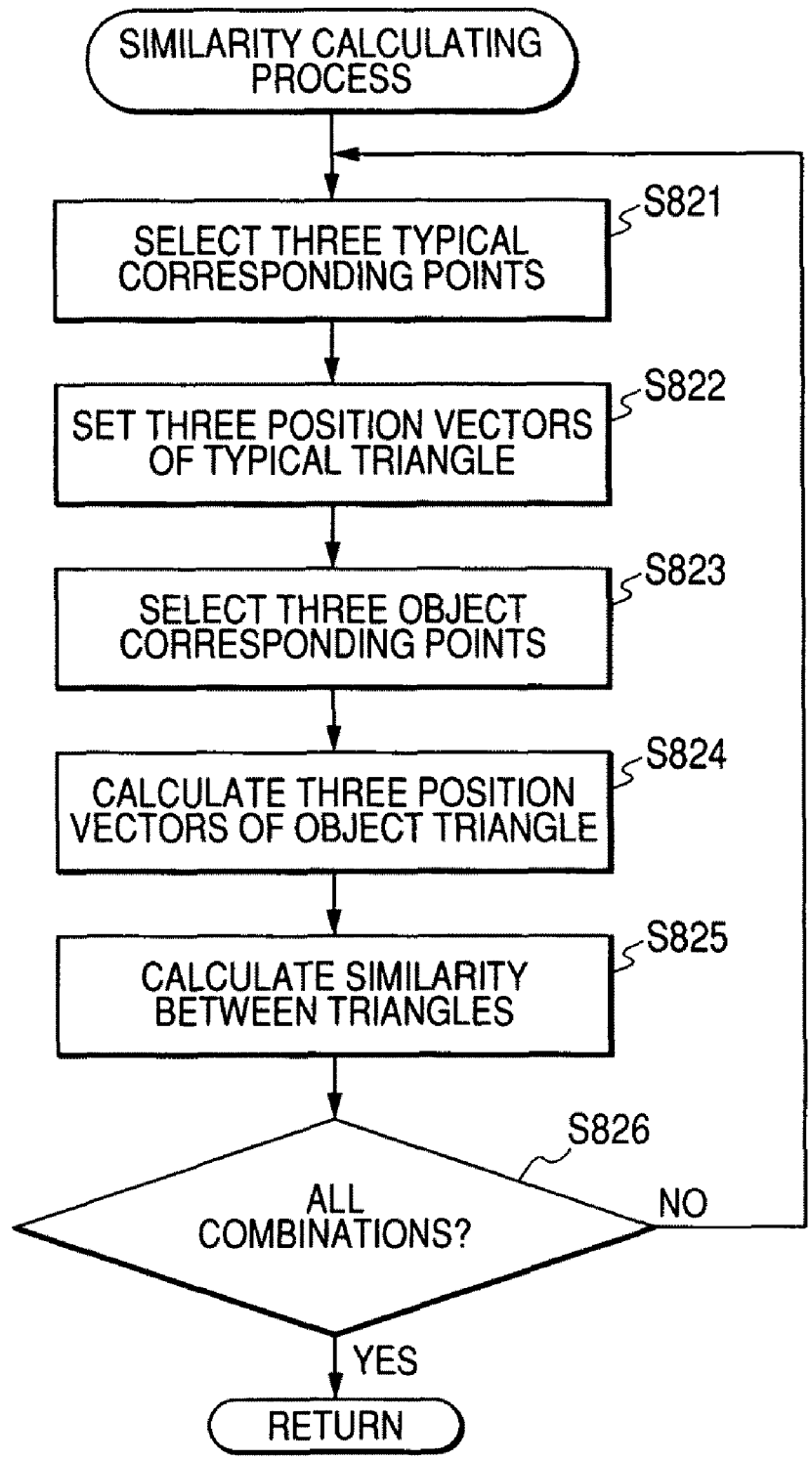
FIG. 23 is a flow chart of a similarity calculating process in the process shown in FIG. 20.

This similarity calculating process is described in detail with reference to FIG. 23. FIG. 23 is a flow chart of the similarity calculating process.

As shown in FIG. 23, at step S821, three typical corresponding points determining a typical triangle are arbitrarily selected from one typical image. At step S822, three position vectors A-bar, B-bar and C-bar of the three corresponding points are set from positions of the three typical corresponding points in the typical image. The vectors are given according to a formula (17).

$$\left.\begin{array}{l}\overline{A}(\Delta x_{tempA}, \Delta y_{tempA})\\ \overline{B}(\Delta x_{tempB}, \Delta y_{tempB})\\ \overline{C}(\Delta x_{tempC}, \Delta y_{tempC})\end{array}\right\} \quad (17)$$

For example, when three typical corresponding points A, B and C are selected, the vectors A-bar denotes a positional difference between the points A and B to indicate a relative position of the point A to the point B, the vectors B-bar denotes a positional difference between the points B and C to indicate a relative position of the point B to the point C, and the vectors C-bar denotes a positional difference between the points C and A to indicate a relative position of the point C to the point A.

At step S823, three object corresponding points matching with the typical corresponding points are selected from the input image to determine a combination of typical and object triangles. At step S824, three position vectors A'-bar, B'-bar and C'-bar of the three object corresponding points determining the object triangle are calculated from the positions of the three object corresponding points. The vectors are given according to a formula (18).

$$\left.\begin{array}{l}\overline{A}'(\Delta x_{inA'}, \Delta y_{inA'})\\ \overline{B}'(\Delta x_{inB'}, \Delta y_{inB'})\\ \overline{C}'(\Delta x_{inC'}, \Delta y_{inC'})\end{array}\right\} \quad (18)$$

The vector A'-bar denotes a positional difference between two object corresponding points A' and B' matching with two typical corresponding points from which the vector A-bar is determined and indicates a relative position of the point A' to the point B'. The vector B'-bar denotes a positional difference between two object corresponding points B' and C' matching with two typical corresponding points from which the vector B-bar is determined and indicates a relative position of the point B' to the point C'. The vector C'-bar denotes a positional difference between two object corresponding points C' and A' matching with two typical corresponding points from which the vector C-bar is determined and indicates a relative position of the point C' to the point A'.

At step S825, a similarity Sim between the typical triangles determined by the typical corresponding points and the object triangle determined by the object corresponding points is calculated from elements of the vectors. The similarity Sim is given according to a formula (19).

$$Sim = \left|\frac{\|\overline{A}'\|}{\|\overline{A}\|} - \frac{\|\overline{B}'\|}{\|\overline{B}\|}\right| + \left|\frac{\|\overline{B}'\|}{\|\overline{B}\|} - \frac{\|\overline{C}'\|}{\|\overline{C}\|}\right| + \left|\frac{\|\overline{C}'\|}{\|\overline{C}\|} - \frac{\|\overline{A}'\|}{\|\overline{A}\|}\right| \quad (19)$$

-continued $$\|\overline{A}\| = \sqrt{\Delta x_{tempA}^2 + \Delta y_{tempA}^2}, \|\overline{A}'\| = \sqrt{\Delta x_{inA'}^2 + \Delta y_{inA'}^2}$$

$$\|\overline{B}\| = \sqrt{\Delta x_{tempB}^2 + \Delta y_{tempB}^2}, \|\overline{B}'\| = \sqrt{\Delta x_{inB'}^2 + \Delta y_{inB'}^2}$$

$$\|\overline{C}\| = \sqrt{\Delta x_{tempB}^2 + \Delta y_{tempB}^2}, \|\overline{C}'\| = \sqrt{\Delta x_{inC'}^2 + \Delta y_{inC'}^2}$$

Each triangle has three sides corresponding to those of the other triangle, and the corresponding sides in each set have a length ratio. The similarity Sim is calculated by adding an absolute difference between first and second length ratios, an absolute difference between second and third length ratios and an absolute difference between third and first length ratios together. Therefore, as one triangle approaches a similar figure of the other triangle, a value of the similarity Sim is lowered, and a level of similarity between the triangles is heightened. When the triangles are completely similar to each other, the similarity Sim becomes equal to zero.

The similarity Sim is equivalent to a similarity between a relationship among relative positions of the three object corresponding points to one another and a relationship among relative positions of the three typical corresponding points to one another.

At step S826, the block 28 judges whether or not similarities for all combinations of typical and object triangles have been calculated. In case of the negative judgment, a similarity in another combination is calculated at steps S821 to S825. When similarities for all combinations have been calculated, the similarity calculating process is completed.

Returning to FIG. 20, at step S830, the block 28 judges based on the similarities Sim whether or not the typical and object triangles in at least one combination are substantially similar to each other. In other words, the block 28 judges whether or not a value of the similarity Sim in at least one combination is lower than a predetermined value. If an object picture matching with a typical image exists in the input image, the triangles become similar to each other. The similarity of the triangles is obtained even when there is a scale difference or a rotation difference between the object picture and the typical image.

When the triangles in one combination are substantially similar to each other, at step S840, the block 28 makes a judgment on a scale ratio in the same manner as that at step S550 (see FIG. 11). In case of the affirmative judgment, at step S850, the block 28 makes a judgment on a rotation difference θ temp −θ in in the same manner as that at step S560 (see FIG. 11). In case of the affirmative judgment, at step S860, the block 28 judges that an object picture having the object corresponding points in the input image matches with the typical image. Then, the block 28 recognizes the object picture as an object indicated by the typical image. Therefore, the object judging and recognizing process is completed. In contrast, in case of the negative judgment at step S810, S830, S840 or step S850, the block 28 judges at step S870 that no object picture matching with the typical image exists in the input image. Therefore, the block 28 recognizes no object indicated by the typical image. The object judging and recognizing process is performed for each of the other typical images, in the same manner, and the object recognizing process is completed.

As described above, in the apparatus 1 according to this embodiment, all combinations of typical and object triangles are set, and a similarity between the typical and object triangles in each combination is calculated from position vectors of three typical corresponding points determining the typical triangle and position vectors of three object corresponding points matching with the typical corresponding points. When the similarity between the typical and object triangles in one combination indicates that the triangles are substantially similar to each other, the apparatus 1 judges that an object picture matching with the typical image exists in the input image.

Accordingly, even when keypoints of an object picture matching with a typical image are insufficiently extracted from an input image, the apparatus 1 can reliably recognize the object picture as an object indicated by the typical image.

Modifications

In this embodiment, an object picture matching with a typical image is recognized as an object indicated by the typical image on the basis of a similarity between typical and object triangles, and this similarity represents a similarity between a relationship among relative positions of three object corresponding points determining the object triangle and a similarity between a relationship among relative positions of the three typical corresponding points determining the typical triangle. Therefore, when at least three object corresponding points are obtained, the apparatus 1 can recognize the object. However, even if the number of object corresponding points required to recognize an object is increased, an object indicated by a typical image may be recognized based on a similarity between typical and object polygonal figures.

In the first and second embodiments, the object judging and recognizing process is performed regardless of the number of typical corresponding points or the number of object corresponding points. However, when the number of object corresponding points is sufficiently large as compared with the number of typical keypoints, an object picture matching with a typical image exists in the input image at a high probability. In contrast, when the number of object corresponding points is small as compared with the number of typical keypoints, there is a probability that a large part of the object picture matching with a typical image is hidden due to occlusion behind another object. Therefore, the probability that an object picture matching with a typical image exists in the input image is not zero, but the object picture exists in the input image at a low probability. Because of this reason, when a ratio of the number of object corresponding points to the number of typical keypoints is higher than a predetermined value, the block 28 may judges that an object picture matching with a typical image exists in the input image to recognize the object picture as an object indicated by the typical image. For example, when the number of object corresponding points exceeds 80% of the number of typical keypoints, an object picture matching with a typical image exists in the input image at a very high probability.

Further, in the corresponding point setting process (see FIG. 9) of the first embodiment, when a difference between the highest level of similarity and the second highest level of similarity is more than a predetermined level, a typical keypoint and an object keypoint having the highest level of similarity are set as a combination of a typical corresponding point and an object corresponding point matching with each other. However, a typical keypoint and an object keypoint having the highest similarity among similarities between the typical keypoint and the object keypoints may always be set as a combination of a typical corresponding point and an object corresponding point matching with each other for each typical keypoint. Further, a typical keypoint and an object keypoint having the highest similarity among similarities between the typical keypoints and the object keypoint may be set as a combination of a typical corresponding point and an object corresponding point matching with each other for each object keypoint.

In the first and second embodiments, the sign recognition apparatus 1 mounted in a vehicle is applied for an object recognition apparatus according to the present invention. However, any recognition apparatus can be applied as an object recognition apparatus on condition that the apparatus performs the extraction of keypoints from the typical image and the input image, the calculation of features of the keypoints and being able to recognize if an object picture of the input image matches with the typical image.

In this specification, the expression "a positional relationship among object corresponding points is similar to a positional relationship among typical corresponding points" is used. This expression denotes that, when an object polygonal figure obtained by connecting the object corresponding points with one another is adequately sized up or down in the input image, the object polygonal figure adequately sized up or down can become congruent to a typical polygonal figure obtained by connecting the typical corresponding points with one another. In other words, the expression denotes that the object polygonal figure is similar to the typical polygonal figure.

What is claimed is:

1. An object recognition apparatus comprising:
a processer to implement a typical feature point extracting unit that extracts a plurality of typical feature points from a typical image;
a first feature calculating unit that calculates a feature of each typical feature point from image data of the typical image;
an object feature point extracting unit that extracts a plurality of object feature points from an input image;
a second feature calculating unit that calculates a feature of each object feature point from image data of the input image;
a corresponding point setting unit that calculates similarities between the feature of one typical feature point and the features of the object feature points for each typical feature point, judges based on the similarities whether or not the features of both one typical feature point and one object feature point in each pair are similar to each other, and sets one typical feature point and one object feature point in each pair, having the features similar to each other, as a typical corresponding point and an object corresponding point matching with each other;
an information producing unit that produces position information indicating positions of the typical feature points in the typical image;
a judging unit that judges based on position information of the typical corresponding points whether or not a positional relationship between or among the object corresponding points is substantially similar to a positional relationship between or among the typical corresponding points; and
a recognizing unit that recognizes an object picture having the object corresponding points in the input image as an object indicated by the typical image when the judging unit judges that the positional relationships are substantially the same as each other.

2. The apparatus according to claim 1, wherein the information producing unit is adapted to set a typical reference point in the typical image and to set a position vector indicating a positional difference between the typical reference point and each typical feature point as the position information of the typical feature point, the judging unit is adapted to determine a position of an object reference point matching with the typical reference point in the input image from the position of each object corresponding point and the position vector of the typical corresponding point matching with the object corresponding point and to judge whether or not the positions of the object reference point are concentrated at a concentration higher than a predetermined concentration value, and the recognizing unit is adapted to recognize the object when the positions of the object reference point are concentrated at a concentration higher than the predetermined concentration value.

3. The apparatus according to claim 2, wherein the judging unit is adapted to set the predetermined concentration value in accordance with the number of typical feature points.

4. The apparatus according to claim 2, wherein the judging unit is adapted to set a small region including one position of the object reference point in the input image each time the position of the object reference point is determined by one object corresponding point on condition that the position of the object reference point is not placed in any of other small regions already set, and the judging unit is adapted to judge that the positions of the object reference point are concentrated at a concentration higher than the predetermined concentration value when the positions of the object reference point are placed in one of the small regions at a predetermined possibility or more.

5. The apparatus according to claim 2, wherein
the judging unit is adapted to adjust the position vector of the typical corresponding point matching with each object corresponding point to an adjusted position vector so as to compensate a scale difference or a rotation difference between the input image and the typical image, and to determine the position of the object reference point from the position of each object corresponding point and the adjusted position vector of the typical corresponding point matching with the object corresponding point.

6. The apparatus according to claim 1, wherein the information producing unit is adapted to set typical position vectors indicating relative positions of one typical feature point to the other typical feature points as the position information of the typical feature point for each typical feature point, the judging unit is adapted to calculate object position vectors indicating relative positions of each object corresponding point to the other object corresponding points, to determine the positional relationship among the typical corresponding points from the typical position vectors of the typical corresponding points, to determine the positional relationship among the object corresponding points from the object position vectors of the object corresponding points, and to judge whether or not the relationships are substantially similar to each other, and the recognizing unit is adapted to recognize the object in response to the judgment of the judging unit.

7. The apparatus according to claim 6, wherein the judging unit is adapted to select three of the typical corresponding points, to set a typical triangle determined by the three typical corresponding points, to set an object triangle determined by three object corresponding points matching with the three typical corresponding points, to judge based on the typical position vectors of the three typical corresponding points and the object position vectors of the three object corresponding points whether or not the object triangle is substantially similar to the typical triangle, and the recognizing unit is adapted to recognize the object when the object triangle is substantially similar to the typical triangle.

8. The apparatus according to claim 1, wherein the object picture of the input image has a scale or a rotation different from that of the typical image.

9. An object recognition apparatus comprising:
a processer to implement a typical feature point extracting unit that extracts a plurality of typical feature points from a typical image;
a first feature calculating unit that calculates a feature of each typical feature point from image data of the typical image;
an object feature point extracting unit that extracts a plurality of object feature points from an input image;
a second feature calculating unit that calculates a feature of each object feature point from image data of the input image;
a corresponding point setting unit that calculates similarities between the feature of one typical feature point and the features of the object feature points for each typical feature point, judges based on the similarities whether or not the features of both one typical feature point and one object feature point in each pair are similar to each other, and sets one typical feature point and one object feature point in each pair, having the features similar to each other, as a typical corresponding point and an object corresponding point matching with each other;
a judging unit that judges whether or not a ratio of a number of object corresponding points to a number of typical feature points is higher than a predetermined value; and
a recognizing unit that recognizes an object picture having the object corresponding points in the input image as an object indicated by the typical image when the judging unit judges that the ratio is higher than the predetermined value.

* * * * *

UNITED STATES PATENT AND TRADEMARK OFFICE
CERTIFICATE OF CORRECTION

PATENT NO. : 8,027,514 B2  
APPLICATION NO. : 12/080936  
DATED : September 27, 2011  
INVENTOR(S) : Masanari Takaki et al.

Page 1 of 1

It is certified that error appears in the above-identified patent and that said Letters Patent is hereby corrected as shown below:

In the Title Page:

Item (73), Assignee: "Denso Corporation, Kariya (JP)" should be:

Denso Corporation, Kariya-city, Aichi-pref. (JP)

Hironobu Fujiyoshi, Kasugai-shi, Aichi-ken (JP)

Signed and Sealed this
Fourth Day of June, 2013

Teresa Stanek Rea
*Acting Director of the United States Patent and Trademark Office*

UNITED STATES PATENT AND TRADEMARK OFFICE
CERTIFICATE OF CORRECTION

| | |
|---|---|
| PATENT NO. | : 8,027,514 B2 |
| APPLICATION NO. | : 12/080936 |
| DATED | : September 27, 2011 |
| INVENTOR(S) | : Masanari Takaki et al. |

It is certified that error appears in the above-identified patent and that said Letters Patent is hereby corrected as shown below:

In the claims

Col. 22, line 27, claim 1, delete "processer" and substitute --processor-- therefor Col. 24, line 20, claim 9, delete "processer" and substitute --processor-- therefor Signed and Sealed this
Seventeenth Day of November, 2015

Michelle K. Lee
*Director of the United States Patent and Trademark Office*